(12) United States Patent
Luo

(10) Patent No.: US 9,894,554 B2
(45) Date of Patent: Feb. 13, 2018

(54) PACKET DATA NETWORK GATEWAY AND TERMINAL MOBILITY MANAGEMENT SYSTEM

(75) Inventor: Wen Luo, Shenzhen (CN)

(73) Assignee: ZTE Corporation, Shenzhen, Guangdong Province (CN)

(*) Notice: Subject to any disclaimer, the term of this patent is extended or adjusted under 35 U.S.C. 154(b) by 1113 days.

(21) Appl. No.: 14/402,725

(22) PCT Filed: Mar. 16, 2012

(86) PCT No.: PCT/CN2012/072412
§ 371 (c)(1),
(2), (4) Date: Nov. 21, 2014

(87) PCT Pub. No.: WO2012/136097
PCT Pub. Date: Oct. 11, 2012

(65) Prior Publication Data
US 2015/0156660 A1 Jun. 4, 2015

(30) Foreign Application Priority Data

Apr. 7, 2011 (CN) .......................... 2011 1 0086745
Jan. 18, 2012 (CN) .......................... 2012 1 0015795

(51) Int. Cl.
*G01R 31/08* (2006.01)
*H04W 28/02* (2009.01)
(Continued)

(52) U.S. Cl.
CPC ......... *H04W 28/0226* (2013.01); *H04W 8/02* (2013.01); *H04W 8/18* (2013.01);
(Continued)

(58) Field of Classification Search
None
See application file for complete search history.

(56) References Cited

U.S. PATENT DOCUMENTS

2009/0176496 A1* 7/2009 Li ....................... H04L 12/5695
455/437
2009/0285179 A1 11/2009 Jones et al.
(Continued)

FOREIGN PATENT DOCUMENTS

CN 1710967 A 12/2005
CN 101459971 A 6/2009
(Continued)

OTHER PUBLICATIONS

International Search Report for PCT/CN2012/072412 dated May 9, 2012.

*Primary Examiner* — Jutai Kao
(74) *Attorney, Agent, or Firm* — Ling Wu; Stephen Yang; Ling and Yang Intellectual Property

(57) ABSTRACT

A packet data network gateway and a UE mobility management system are disclosed. In the packet data network gateway, a context management unit is configured to: when the P-GW is selected as the UE's target P-GW, create a context for the UE and store the UE's context information from S-GW and a source P-GW to which the UE is currently attached; an identity management unit is configured to: assign a location identity including the UE's routing information to the UE. The present invention reselects a P-GW for the UE to attach, thereby eliminating the circuitous routing in the process of the UE connecting and using services, saving transmission bearer resources, reducing transmission delay of data packet, and ensuring that the UE is still reachable after changing the attached P-GW, thus neither the UE nor the peer end is aware of the movement of the UE in the IP level.

19 Claims, 9 Drawing Sheets

(51) Int. Cl.
*H04W 8/18* (2009.01)
*H04W 8/02* (2009.01)
*H04W 36/00* (2009.01)
*H04W 40/36* (2009.01)
*H04W 88/16* (2009.01)

(52) U.S. Cl.
CPC ... *H04W 28/0252* (2013.01); *H04W 36/0033* (2013.01); *H04W 36/0044* (2013.01); *H04W 40/36* (2013.01); *H04W 88/16* (2013.01)

(56) References Cited

U.S. PATENT DOCUMENTS

| | | | |
|---|---|---|---|
| 2011/0122845 A1* | 5/2011 | Meirosu | H04W 36/0055 370/332 |
| 2012/0252355 A1* | 10/2012 | Huang | H04W 36/0033 455/7 |
| 2012/0264443 A1* | 10/2012 | Ng | H04W 4/005 455/450 |
| 2012/0320876 A1* | 12/2012 | Zhou | H04W 36/12 370/331 |

FOREIGN PATENT DOCUMENTS

| | | |
|---|---|---|
| CN | 101547168 A | 9/2009 |
| CN | 101754332 A | 6/2010 |
| CN | 101789912 A | 7/2010 |
| CN | 101959209 A | 1/2011 |
| CN | 101990312 A | 3/2011 |
| WO | 2011032479 A1 | 3/2011 |

\* cited by examiner

PACKET DATA NETWORK GATEWAY AND TERMINAL MOBILITY MANAGEMENT SYSTEM

TECHNICAL FIELD

The patent document relates to the evolved packet system in the field of mobile communications, and more particularly, to a packet data network gateway and a UE mobility management system.

BACKGROUND OF THE INVENTION

The 3rd Generation Partnership Project (referred to as 3GPP) Evolved Packet System (referred to as EPS) is composed of Evolved Universal Terrestrial Radio Access Network (referred to as E-UTRAN), Mobility Management Entity (referred to as MME), Serving Gateway (S-GW), Packet Data Network Gateway (referred to as P-GW or PDN GW), Home Subscriber Server (referred to as HSS), 3GPP Authentication, Authorization and Accounting (referred to as AAA) server, Policy and Charging Rules Function (referred to as PCRF) entity and other support nodes.

FIG. 1 is a structural diagram of an EPS system in the related art, as shown in FIG. 1, the MME is responsible for control plane related work such as mobility management and non-access stratum signaling processing; the S-GW is an access gateway device connected with the E-UTRAN, forwarding data between the E-UTRAN and the P-GW, and it is responsible for buffering the paging waiting data; the P-GW is a border gateway between the EPS and the packet data network (referred to as PDN), and it is responsible for the PDN access, forwarding data between the EPS and the PDN, and other functions. In the 3GPP, the corresponding PDN network can be found out through the Access Point Name (referred to as APN). Usually, a connection from a User Equipment (referred to as UE) to the PDN network is called an IP Connectivity Access Network (referred to as IP-CAN) session.

One important feature of the mobile network is to maintain the service continuity in a process that the UE consistently moves. In the EPS system, the continuity is ensured by the mobility management functions, mainly including handover and tracking area update, of the system handover. Said mobility management serves to ensure the continuity of the UE services, to ensure that the UE is always reachable in the view of the outside when the UE moves in the network, so that the UE and the peer end communicating with the UE do not have a perception in the IP level that the UE's location changes. In brief, the UE has a valid IP address unchanged in the moving process. In the process of mobility management, the UE may change the currently connected S-GW, and this scenario will be described in the following.

As shown in FIG. 2a, the S-GW to which the UE is currently connected changes, and the source eNodeB and the target eNodeB are connected to different S-GWs. When the UE moves from the service area of source S-GW to the service area of target S-GW, the network (or the UE itself) is triggered to change the currently connected S-GW for the UE. Before the change (on the left side in FIG. 2a), the uplink and downlink data transmission path of UE is: UE<->source S-GW<->P-GW<->PDN network; after the change (on the right side in FIG. 2a), the uplink and downlink data transmission path of UE is: UE<->Target S-GW<->P-GW<->PDN network. It can be seen that before and after the S-GW changes, the uplink and downlink data of UE always pass through the same P-GW, and the P-GW remains the same, and said P-GW is referred to an Anchor Point of the UE.

No matter how the UE moves, its anchor point will not change, that is, the P-GW to which the UE is attached does not change. Such unchanged anchor point will trigger a series of problems. For example, it might lead to the circuitous routing problem widely recognized in the industry, that is: in a process of one connection as well as a process of the UE using service, the location of UE might change, and when the current location of UE is leaving away from its anchor point, the data flow that the UE interacts with the outside also needs to be forwarded by its anchor point, particularly when the current location of UE is relatively close to the service source that the UE accesses, the circuitous routing problem becomes more apparent (FIG. 2b).

The circuitous routing brings problems in the following aspects:

(One) wasting the transmission bearer resources of operators, which is not conducive to cost savings;

(Two) increasing the delay of transmitting and receiving IP packets between the UE and its communicating peer end, which is not conducive to improving the user's service experience;

(Three) increasing the likelihood of network congestion when the UE's IP packets are transmitted over the network, resulting in that the UE services, for example real-time services such as voice and video, are hindered or even impossible to be implemented.

SUMMARY OF THE INVENTION

To solve the technical problem, the patent document provides a packet data network gateway and a UE mobility management system to avoid circuitous routing problem in an evolved packet system.

To solve the abovementioned technical problem, a packet data network gateway in accordance with the patent document comprises: a context management unit and an identity management unit, wherein:

the context management unit is configured to: when a packet data network gateway (P-GW) is selected as a target P-GW of user equipment (UE), create a context for the UE, and save context information of the UE from a target serving gateway (S-GW) and a source P-GW to which the UE is currently attached;

the identity management unit is configured to: assign a location identity including routing information of the UE for the UE.

A UE mobility management system, comprises: a first network device and a target packet data network gateway (P-GW), wherein said first network device comprises a P-GW selection unit, wherein:

said P-GW selection unit is configured to: in a process of UE moving, select a target P-GW for the UE;

the target P-GW uses the above-mentioned P-GW.

A system for creating a context for a UE, comprises: a first network device, a target serving gateway (S-GW) and a target packet data network gateway (P-GW), wherein said first network device comprises a P-GW selection unit, the target S-GW comprises a session creation unit, and the target P-GW comprises a context management unit, wherein:

said P-GW selection unit is configured to: in a process of UE moving, select a target P-GW for the UE;

said session creation unit is configured to: send a first request to the context management unit, wherein a first request carries address information of a source P-GW to which the UE is currently attached and first context information of the UE;

the context management unit is configured to: after receiving said first request, create a context for the UE and store said context information of the UE, and said context information of the UE comprises said first context information and a second context information obtained by the context management unit from the source P-GW.

A system for creating a context for a UE, comprises: a first network device, a target serving gateway (S-GW), a target packet data network gateway (P-GW) and a source P-GW, wherein said first network device comprises a P-GW selection device, the target S-GW comprises a session modification unit, the target P-GW comprises a context management unit, and the source P-GW comprises a UE transfer processing unit, wherein:

said P-GW selection unit is configured to: in a process of UE moving, select a target P-GW for the UE;

said session modification unit is configured to: send a request for modifying bearers for the UE to said UE transfer processing unit in the source P-GW to which the UE is currently attached, and said request carries first context information of the UE;

said UE transfer processing unit is configured to: after receiving said request for modifying bearers for the UE, send a first request to the context management unit in the target P-GW, wherein, besides said first context information, said request also carries second context information of the UE;

the context management unit is configured to: after receiving said first request, create a context for the UE, and store the first context information and second context information of the UE.

A system for establishing a data channel for a UE, comprises: a first network device, a target serving gateway (S-GW) and a target packet data network gateway (P-GW), wherein, said first network device comprises a P-GW selection unit, the target S-GW comprises a first data channel management unit, and the target P-GW comprises an identity management unit and a second data channel management unit, wherein:

said P-GW selection unit is configured to: in a process of UE moving, select a target P-GW for the UE;

said first data channel management unit is configured to: assign a downlink data channel address to the UE, and send said downlink data channel address to said second data channel management unit;

the identity management unit is configured to: assign a location identity including routing information of the UE for the UE, and send said location identity to a source P-GW to which the UE is currently attached;

said second data channel management unit is configured to: assign an uplink data channel address to the UE, and send said uplink data channel address to said first data channel management unit.

The embodiment of the present invention re-selects a P-GW to which the UE is attached, so as to eliminate the circuitous routing in the process of the UE connecting and using a service, save transmission bearer resources, reduce transmission delay of data packet, and ensure that after the attached P-GW changes, the UE is still reachable, and the UE and its peer end cannot have a perception in the IP level that the UE moves.

PREFERRED EMBODIMENTS OF THE PRESENT INVENTION

The circuitous routing problem is caused by a fixed anchor point, such as the abovementioned P-GW, always existing in a process of UE moving. When the UE moves, the essential reason why its anchor point cannot change is that, in a TCP/IP protocol framework, the IP address represents the location and identity information of UE at the same time.

The method provided in the present embodiment can dynamically transfer its attached P-GW in a moving process, thus eliminating the fixing anchor point of UE and solving the circuitous routing problem.

The present embodiment provides a mobility management method in the EPS network, to make the UE dynamically change its attached P-GW (that is, eliminate the anchor point) in the moving process, so as to solve the circuitous routing problem.

In order to enable the UE to dynamically change its attached P-GW, in the present embodiment, it is required to assign an identity and a location identity to the UE. The role of the identity of UE is to label a Identity of UE, which is fixed, regardless how the UE moves in the network and which P-GW said UE is currently attached to, its identity remains unchanged and it is unique in the domain; the location identity of UE is used to indicate the topology location of UE (that is, indicating the routing information) in the current network, or that is, the P-GW in which the UE is located can be located based on said location identity.

Preferably, said identity of UE is a fixed IP address assigned by the network (or operator) to the UE; said location identity of UE is the IP address of P-GW in the EPS.

At this time, regardless how the UE moves in said EPS system, said IP address of UE (that is, identity) is valid and can be routed (routed through said location identity).

Figure 1:
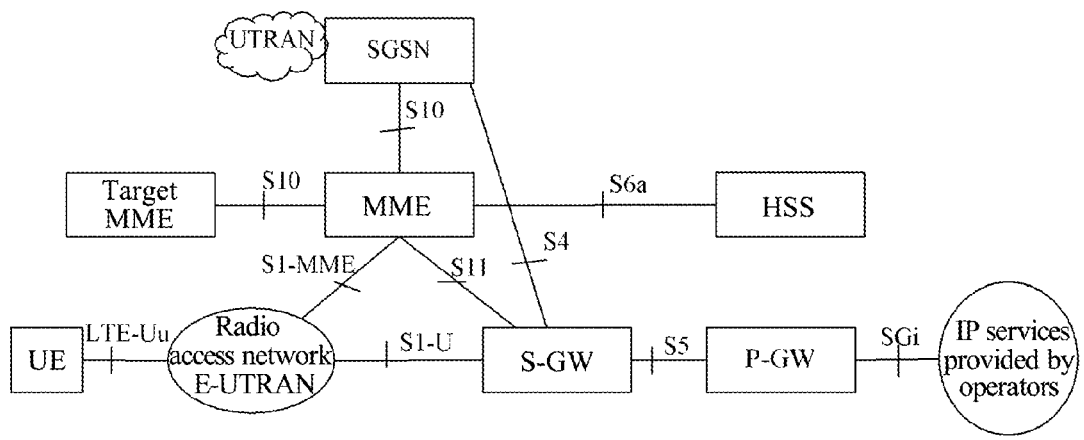
FIG. 1 is a structural diagram of the EPS in the related art.
Figure 2A:
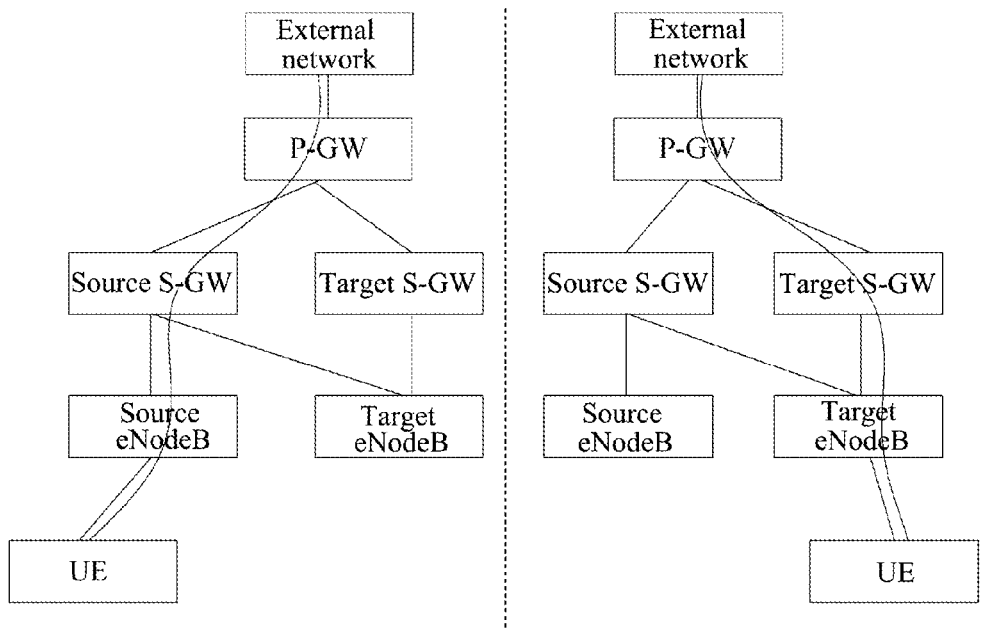
FIG. 2a is a schematic diagram of the route of the messages in the related art.
Figure 2B:
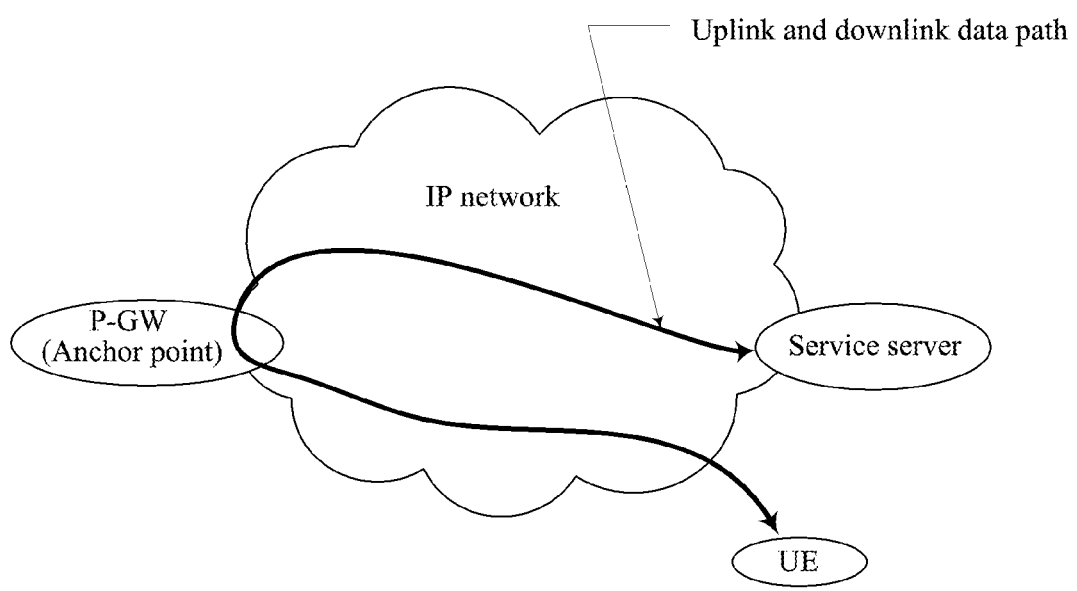
FIG. 2b is a schematic diagram of the circuitous routing problem in the related art.

The present embodiment also proposes to add a new logical network element, referred to as "mapping server" or "Identity Location Register (ILR)", into the network architecture shown in FIG. 1, and said network element is used to store the mapping relationship information of identity-location identity of UE. Said identity location register can exist as a separate physical entity, or exist in the form of logic functions in other physical entity such as the AAA server, HSS, MME or the like. Corresponding to the above-mentioned two forms, new interfaces are required to be established respectively between said P-GW and said network element, or the existing interfaces should be reused or extended.

After the communicating peer end of UE sends data packets to the UE, if the communicating peer end does not know the location identity of UE, firstly it needs to search for the current location identity of the UE in said identity location register, after acquiring said location identity, said communicating peer end sends data packets to the P-GW to which said location identity points, and then said P-GW further forwards said data packets to the UE according to the identity of UE.

It should be noted that the above-mentioned function of inquiring the identity location register can also be performed by the access gateway of said communicating peer end (that is, the P-GW connected with the communicating peer end) besides the communicating peer end itself, and said communicating peer end firstly sends the data packets that are sent to the UE to its access gateway, and said access gateway checks if the access gateway itself has the location identity of UE, if no, searching for the location identity of UE in said identity location register, and then forwarding the data packets. In brief, said communicating peer end in the following may refer to the communicating peer end itself or the access gateway connected with said communicating peer end.

The above-mentioned identity of UE can be represented with AID (Access Identity), and said location identity of UE can be represented with RID (Routing Identify). In the following, the AID is used to represent the identity of UE, and the RID is used to represent the location identity of UE; the ILR is used to represent the identity location register.

The method for achieving the UE handover in the present embodiment, that is, the method for the UE dynamically changing the currently attached P-GW in the moving process, will be described in detail in the following.

First Embodiment

Figure 3:
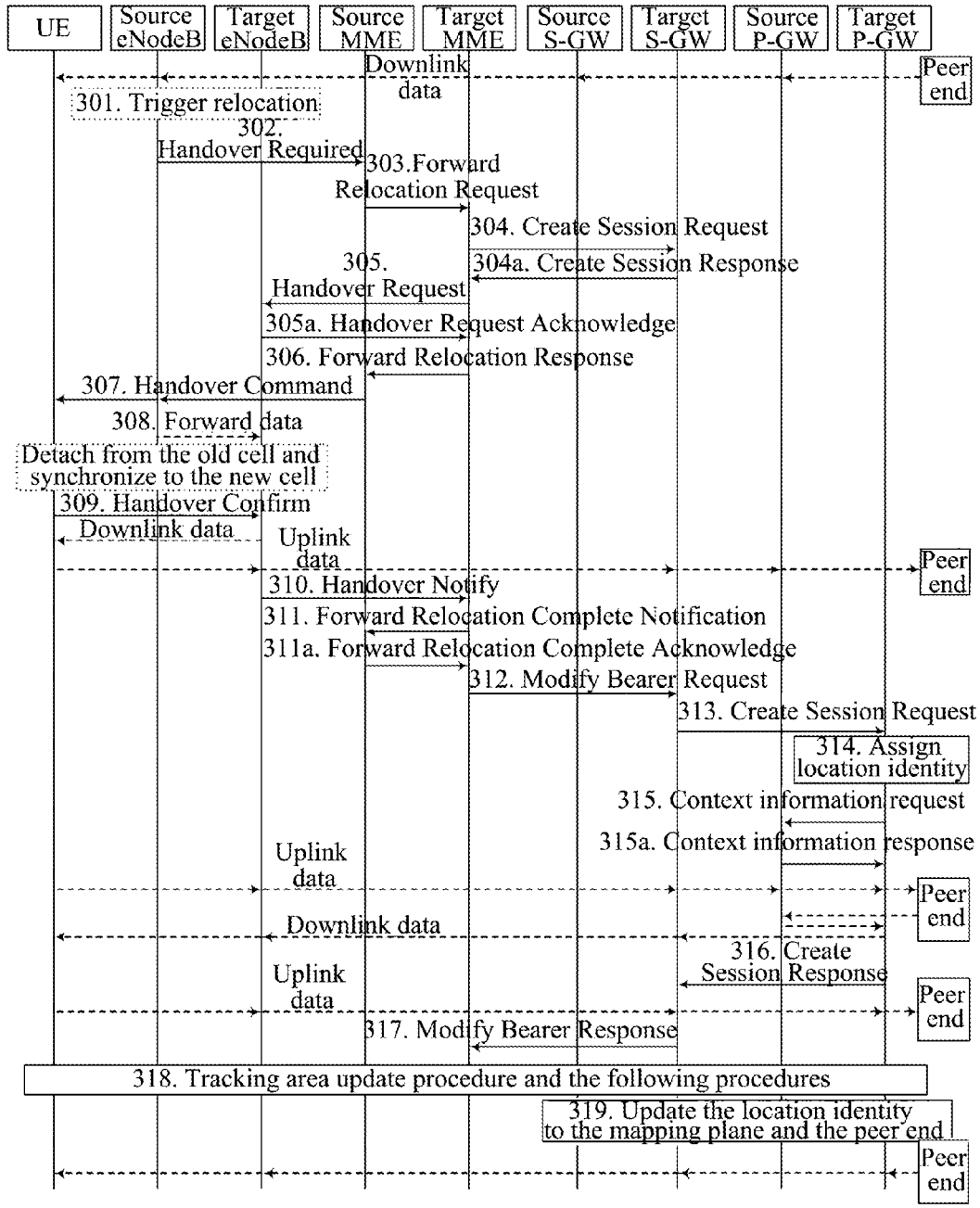
FIG. 3 is a flow chart of a first embodiment of achieving UE handover in accordance with the patent document.

The first embodiment shown in FIG. 3 is an example of changing the P-GW to which the UE is currently attached in the S1 handover scenario. It should be noted that the eNodeB to which the UE is attached before the handover is "Source eNodeB", and the S-GW attached before the handover is "Source S-GW"; the eNodeB attached after the handover is "Target eNodeB", and the S-GW attached after the handover is "Target S-GW". Moreover, in a handover scenario, the UE may change the MME that is currently in use, accordingly, the MMEs used before and after the handover are called "source MME" and "target MME" respectively. The P-GW to which the UE is attached is changed in the handover in the present embodiment, and the P-GWs before and after the handover are called "source P-GW" and "target P-GW" respectively. Before performing the S1 handover, the uplink and downlink data transmission path of UE is: UE<->Source eNodeB<->Source S-GW <->Source P-GW. The specific steps of the present embodiment are as follows:

step 301: said source eNodeB initiates a relocation process to the target eNodeB;

step 302: said source eNodeB sends the source MME a handover required message which carries an identity of UE and an identity of target eNodeB;

step 303: the source MME determines whether it needs to change the MME currently in use for the UE or not, assuming that it needs to change in the following, then the source MME sends the target MME a Forward Relocation Request message which carries the PDN connection information (MME UE EPS PDN Connections) stored by said source MME of UE, and said information contains the current bearer information of the UE and so on;

It should be noted that if it does not need to change the MME used by the UE, the interaction involved between the MMEs may be omitted, and the source MME and the target MME in this embodiment can be viewed as a single entity.

Step 304: the target MME selects a new S-GW (Target S-GW) for the UE, and sends the target S-GW a Create Session Request message, and creates session information on said S-GW for the UE; the creates session request message carries one or more of the source P-GW's control plane address information, the PDN address (that is, said IP address of UE) and the PDN connection information, wherein, said PDN connection information comprises the information of all bearers of UE;

step 304a: the target S-GW returns a Create Session Response message to the target MME, wherein the Create Session Response message carries the uplink data channel address information assigned by the target S-GW to the UE;

step 305: the target MME sends a handover request message to the target eNodeB, requesting the target eNodeB to allocate air interface resources to the UE, meanwhile it notifies the target eNodeB of the uplink data channel address information assigned by the target S-GW to the UE;

step 305a: the target eNodeB allocates air interface resources to the UE, and returns a Handover Request Acknowledge message carrying the information of the downlink data channel address assigned to the UE to the target MME;

step 306: the target MME returns a Forward Relocation Response message to the source MME;

step 307: the source MME sends a Handover Command message to the UE via said source eNodeB;

step 308: said source eNodeB starts to forward the received downlink data to the target eNodeB;

step 309: the UE detaches from the old cell, and attaches to a new cell, and the UE sends a Handover Confirm message to the target eNodeB, and the target eNodeB starts to send the UE the downlink data received from said source eNodeB via the air interface;

the downlink data transmission path at this time is: peer end->source P-GW->source S-GW->source eNodeB->target eNodeB->UE; the uplink data transmission path is: UE->target eNodeB->target S-GW->source P-GW->peer end. Wherein, the target S-GW learns the uplink data channel address information of source P-GW in step 304; the target eNodeB learns the uplink data channel address information of target S-GW in step 305.

Step 310: the target eNodeB sends a Handover Notify message to the target MME;

step 311: the target MME sends a Forward Relocation Complete Notification message to the source MME;

step 311a: the source MME returns a Forward Relocation Complete Acknowledge message to the target MME;

step 312: the target MME sends the target S-GW a Modify Bearer Request message carrying the information of the bearers required to be modified;

preferably, the target MME may select one new P-GW (target P-GW) for the UE. For example, the target MME selects a P-GW closest to the S-GW to which the UE is currently connected for the UE based on the location information of the S-GW to which the UE is currently connected (the location information of S-GW may be pre-configured in the MME by the operator), so as to reduce the circuitous routing. At this time, the target MME also needs to carry the address information of target P-GW, such as the IP address or domain name of target P-GW, in the abovementioned Modify Bearer Request message.

Step 313: the target S-GW sends a create context request message (such as, sending a create session request message) carrying said identity of UE (such as the UE's IMSI) to the target P-GW, so as to trigger the target P-GW to create a context for the UE;

the target S-GW in this step needs to assign a downlink data channel address used on the target S-GW for UE, carries the downlink data channel address in the request message and sends it to the target P-GW. Said downlink data channel address specifically means: when the GTP protocol is used between the S-GW and the P-GW, the downlink data channel address information comprises the IP address (IPv4 and/or IPv6) of S-GW's user plane (or called as data plane) as well as a Tunnel End Identity (TEID); when the PMIP protocol is used between said S-GW and said P-GW, said downlink data channel address information comprises the IP address (IPv4 and/IPv6) of S-GW's user plane as well as the Generic Routing Encapsulation key (GRE Key).

The target S-GW needs to notify the target P-GW of its own control plane address information, and the address information specifically refers to: when the GTP protocol is used between said S-GW and said P-GW, the control plane address information comprises the IP address (IPv4 and/or IPv6) of S-GW's control plane (or called as signaling plane) as well as the TEID; when the PMIP protocol is used between said S-GW and said P-GW, the control plane address information comprises the IP address (IPv4 and/or IPv6) of S-GW's control plane.

The target S-GW needs to send the address information of the source P-GW to the target P-GW, so that the target P-GW can find the source P-GW.

Preferably, the target S-GW may send the PDN connection information of UE to the target P-GW in this step, and the target P-GW stores the bearer information in the context of UE. The PDN connection information comprises the bearer information, and said bearer information may include (but not limited to): EPS bearer ID, bearer traffic flow template (TFT), Bearer Level QoS and so on. The transmission of downlink channel address information of target S-GW is described as above.

Preferably, the target S-GW may also send the AID of UE to the target P-GW, and the target S-GW acquires the AID of UE from the target MME. As described above, said AID is preferably the IP address assigned to the UE.

Preferably, the target S-GW may also select a target P-GW for itself, then the MME does not need to provide the target S-GW with the address information of target P-GW.

Of course, in this step, the target S-GW may also not perform one or more of the above preferences, and the bearer information of UE may be acquired by the target P-GW from the source P-GW, as described in the subsequent steps.

Step 314: the target P-GW assigns a new RID to the UE;

if the target S-GW sends the AID of UE to the target P-GW in step 313, said P-GW can store the mapping relationship of AID-RID in the local after assigning a RID to the UE; if the target S-GW does not send said AID to the target P-GW, said P-GW can establish the mapping relationship information of RID and identity of UE (such as IMSI), and after the AID of UE is obtained from the source P-GW subsequently, the mapping relationship information of AID-RID is stored in the local.

Step 315: the target P-GW sends a request message to the source P-GW, requesting the context information of UE from the source P-GW, and the identity of UE and RID are carried in said request message;

As described above (step 313), the target S-GW can provide part of the context information of UE, such as information of one or more bearers of UE, to the target P-GW. However, according to the related art, some of the information about UE needed by the P-GW can only be owned by said P-GW (or said P-GW and UE), at this time, the target S-GW cannot provide the information, such as the Protocol Configuration Options (PCO) and charging-related information and so on, to the target P-GW.

Said PCO is generally used to exchange the configuration information between the UE and the P-GW to which the UE is attached. For example, the UE can configure the value of the MRU (Maximum-Receive-Unit) for the LCP (Link Control Protocol) in use via the PCO between itself and the P-GW to which it is attached, and the parameter needs to remain consistent between the UE and said P-GW, otherwise, it affects receiving and transmitting the IP packets. The UE can also use the PCO to send some of its own user authentication information, such as user name and password when using the PPP and so on, to said P-GW. Without the information, said P-GW cannot provide the UE with normal services; when said P-GW charges the UE, it selects a Charging Gateway and assigns a Charging ID for the UE, and before and after changing said P-GW, the same charging ID and charging gateway should be used by the UE, otherwise it causes an error. Therefore, the target P-GW needs to request the information from the source P-GW.

In this step, the target P-GW needs to send the RID assigned to the UE to the source P-GW.

It should be noted that, the target P-GW may also obtain the bearer information of UE, the AID of UE and so on from the source P-GW, so that the target S-GW does not need to provide the information to the target P-GW.

Step 315a: after the source P-GW receives the request message sent by the target P-GW, it returns a context response message to the target P-GW;

preferably, the source P-GW collects the context information that the target S-GW cannot provide to the target P-GW, and carries the information in the context response message and sends it to the target P-GW. The information comprises, for example, the configuration information that the UE exchanges with the source P-GW via the PCO (or the configuration information received from the previous source P-GW when the source P-GW works as the target P-GW); the address or identity of the charging gateway, the charging identity and other information used by the UE to charge.

After the target P-GW acquires the above-mentioned information, if the target P-GW creates a context for the UE in the local, it configures the corresponding configuration information, such as configuring the MRU of the LCP in use, configuring the required username and password when the UE uses the PPP and so on. The configuration information comprises the configuration information that the UE exchanges with the source P-GW via the Protocol Configuration Options (PCO), or the configuration information acquired from another source P-GW when the source P-GW works as the target P-GW. The target P-GW also stores some of the acquired information in the created context, and the information is such as the address/identity of said charging gateway and the charging identity and so on.

If the target P-GW has not created a context for the UE in the local, at this time, besides configuring the corresponding information for the UE, it also needs to create a context for the UE and stores the acquired bearer information of UE, the address/identity of said charging gateway, the charging identity and other information into the context of UE. It should be noted herein that, for the information about S-GW (such as the control plane address information of S-GW, the downlink data channel address information used on said S-GW and so on) in the context of UE, it is required to store the information of target S-GW, and the target P-GW obtains the information from the target S-GW in step 313.

Moreover, if one or more of the preferences are not performed in step 313, the target S-GW does not provide the information in the preferences to the target P-GW. At this time, the source P-GW needs to provide the information to the target P-GW, for example, the AID of UE and the bearer information of UE and so on are sent to the target P-GW in this step.

In this step, the source P-GW also needs to process the RID of UE. The source P-GW stores the RID of UE in the local, starting from this point, buffering all the received uplink and downlink data packets. Then, the source P-GW sends a context response message to the target P-GW, and after the target P-GW receives and executes the relevant operations (such as creating/updating the context information of UE, and configuring the received configuration parameters and so on), it starts to forward the uplink and downlink data packets to the target P-GW based on the above-mentioned RID.

The source P-GW can start a timer when sending the context response message to the target P-GW, and after said timer expires, said data packets are forwarded to the target P-GW; or after the target P-GW completes the related operations, a confirmation message is sent to the source P-GW, and after the source P-GW receives said confirmation message, it performs the forwarding processing.

At this time, the downlink data transmission path is: peer end->Source P-GW->Target P-GW->Target S-GW->Target eNodeB->UE; while the uplink data transmission path is: UE->Target eNodeB->Target S-GW->Source P-GW->Target P-GW->peer end. For the downlink data, the source P-GW routes the data to the target P-GW according to the RID in this step; the target P-GW acquires the downlink data channel address in the target S-GW in step 313; the target S-GW acquires the downlink data channel address in the target eNodeB in step 312. For the uplink data, the target eNodeB acquires the uplink data channel address in the target S-GW in step 305; the target S-GW acquires the uplink data channel address in the source P-GW in step 304; the source P-GW routes the data to the target P-GW according to the RID in this step.

Step 316: the target P-GW assigns an uplink data channel address to the UE, and returns a response message of the create context request message (such as a create session response message) to the target S-GW, and sends the target S-GW the uplink data channel address information assigned to the UE;

when the GTP protocol is used between said S-GW and said P-GW, the uplink data channel address information comprises the address (IPv4 and/or IPv6 address) of P-GW's user plane and the TEID; when the PMIP protocol is used between said S-GW and said P-GW, the uplink data channel address information comprises the IP address (IPv4 and/or IPv6 address) of P-GW's user plane and the GRE Key.

The target P-GW also needs to send its own control plane address information to the target S-GW, and when said address information specifically refers to: when the GTP protocol is used between said S-GW and said P-GW, said control plane address information comprises the IP address (IPv4 and/or IPv6) of P-GW's control plane and the TEID; when the PMIP protocol is used between said S-GW and said P-GW, said control plane address information comprises the IP address (IPv4 and/or IPv6) of P-GW's control plane.

After the target S-GW receives the response message of the create context request message, it can directly send the uplink data packets to the target P-GW, and the uplink packet path is: UE->Target eNodeB->Target S-GW->Target P-GW->Peer end. Up to now, for the uplink data packets, the process of the UE changing its attached P-GW is completed.

Step 317: the target S-GW returns a Modify Bearer Response message carrying information of target P-GW to the target MME;

For example, the carried information of target P-GW comprises: the identity of target P-GW, the target P-GW's control plane address, and the uplink data channel address (user plane address) of target P-GW and so on, and the target MME stores the updated information in the local.

Step 318: continuing to perform the procedure of Tracking Area Update as well as other procedures;

step 319: after the target P-GW assigns a new RID to the UE, said RID also needs to be notified to the communicating peer end of UE as well as the ILR, and the operation may be performed by the target P-GW or the source P-GW;

if it is performed by the target P-GW, at any time after the generation of said RID, the operation can be performed; if it is performed by the source P-GW, at any time after the source P-GW acquires said RID, the operation can be performed.

For example, a message called "AID-RID mapping relationship update request" is sent to the peer end (if at this time there is a peer end communicating with UE) and the ILR, wherein said message carries the identity of UE (IMSI, AID and so on), as well as the RID updated by UE. When the communicating peer end receives the RID updated by the UE, all the data packets sent to the UE will be first sent to the target P-GW. Of course, after the peer end and the ILR receive the above-mentioned message, it is also required to return a response message to the target P-GW, such as sending a message called "AID-RID mapping relationship update response".

After this, the downlink data packets do not need to be forwarded through the source P-GW, and the path of downlink data packet is: Peer end->Target P-GW->Target S-GW->Target eNodeB->UE. Until now, for the downlink data, the process of the UE changing its attached P-GW is also completed.

The method provided in the present embodiment achieves changing the P-GW to which the UE is currently attached in the S1 handover scenario. It can solve a series of problems caused by the circuitous routing due to the existence of the fixed anchor point.

From the view of acquiring the context information of UE from the target P-GW, this embodiment is the PULL mode.

Second Embodiment

Figure 4:
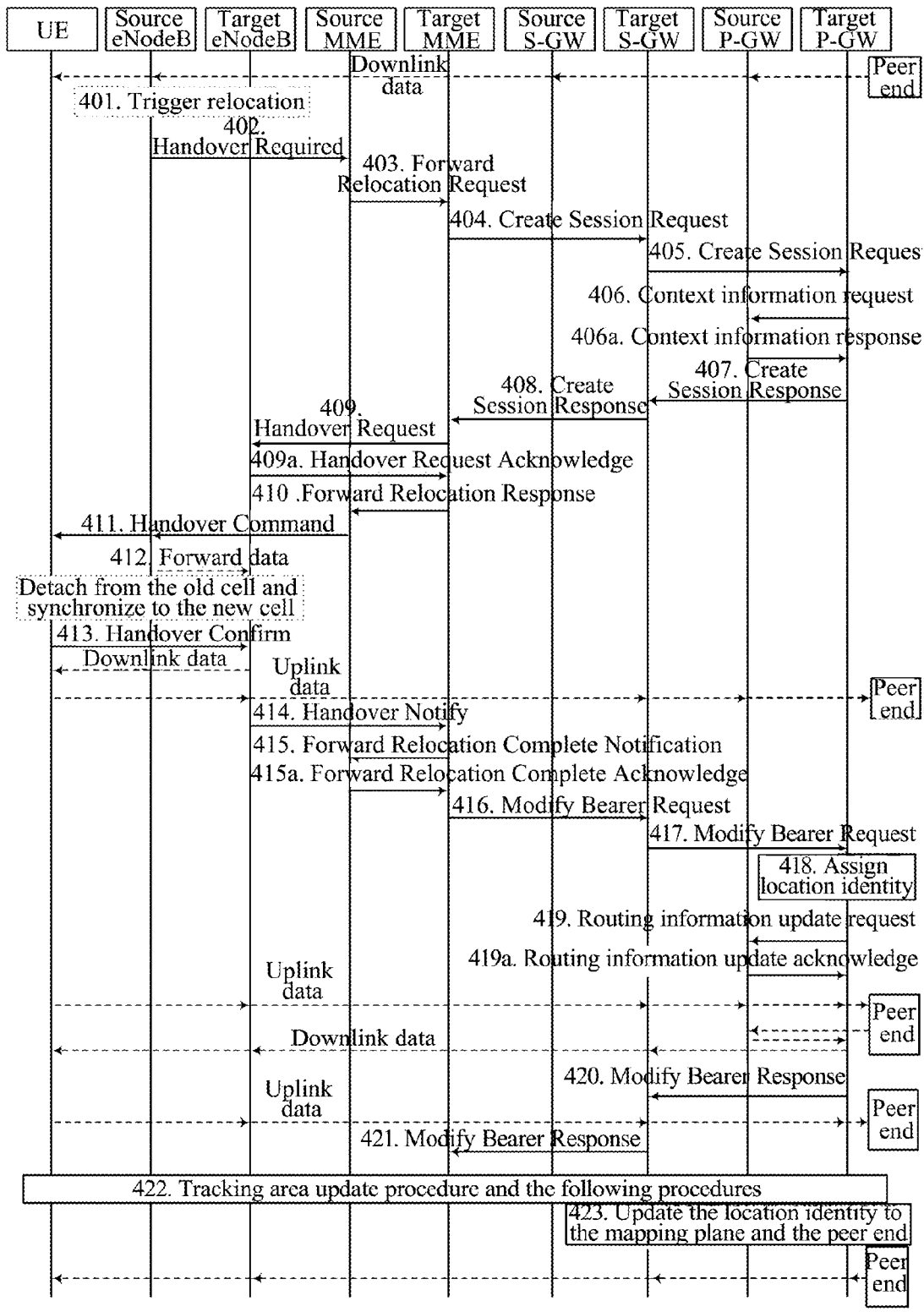
FIG. 4 is a flow chart of a second embodiment of achieving UE handover in accordance with the patent document.

FIG. 4 shows the second embodiment of the present invention, and it is an example of changing the P-GW to which the UE is currently attached in the S1 handover scenario. It specifically comprises the following steps:

steps 401-403: the same as steps 301-303;

step 404: the target MME selects a target S-GW for the UE, sends a create session request message to the target S-GW, and creates session information for the UE on said S-GW, wherein the create session request message carries the control plane address information of source P-GW, the PDN address and the PDN connection information;

Preferably, as described in step 312, the target MME may select one new P-GW for UE as the target P-GW, and carries the address information of the P-GW in said create session request message.

Step 405: the target S-GW sends the target P-GW a create context request message (such as sending the create session request message) carrying the identity of UE (such as the UE's IMSI), so as to trigger creating a context for UE in the target P-GW;

the target S-GW needs to send the address information of the source P-GW to the target P-GW, so that the target P-GW can find the source P-GW.

Preferably, the target S-GW in this step may assign a downlink data channel address used in said S-GW to the UE, and send the downlink data channel address information to the target P-GW via the above-mentioned request message.

Preferably, the target S-GW in this step sends its own control plane address information to the target P-GW via the abovementioned request message.

Preferably, the target S-GW in this step may send the information of one or more bearers of UE to the target P-GW, and the target P-GW stores the information of these bearers in the context of UE.

Preferably, the target S-GW may also send the AID of UE (identity) to the target P-GW.

Preferably, the target S-GW may also select one target P-GW for itself. Then the MME does not need to provide the address information of target P-GW to the target S-GW.

Step 406: the target P-GW sends a message carrying said identity of UE to the source P-GW, and requests the context information of UE from the source P-GW;

Herein, the context information of UE requested by the target P-GW from the source P-GW mainly refers to the information such as the above-mentioned PCO, the charging gateway, the charging identity and so on that only the P-GW (or the P-GW and the UE) can own. Of course, the target P-GW may also obtain the bearer information of UE and the AID of UE and so on from the source P-GW in this step. Thus, in step 405, the target S-GW does not need to provide the information to the target P-GW.

Step 406a: after the source P-GW receives the message sent by the target P-GW, it returns a context response message to the target P-GW;

in accordance with said principle described in the step 315a, the source P-GW returns information such as the PCO, charging gateway, charging identity and so on to the target P-GW. The source P-GW may also send the AID of UE and the bearer information of UE to the target P-GW in this step. The essential difference between the steps 406-406a in this embodiment and the steps 315-315a in the above-mentioned embodiment is that, the target P-GW herein does not provide the RID to the source P-GW (however, the target P-GW may assign and store the RID locally at this moment), and the source P-GW does not need to process the corresponding data routing.

The target P-GW follows the principles described in the step 315a to configure the corresponding information for the UE in the local, and update/create the context information of UE.

Step 407: the target P-GW returns a response message (such as a create session response message) to the target S-GW;

preferably, in this step, the target P-GW may also assign an uplink data channel address to UE, carries the uplink data channel address information in the response message and sends it to the target S-GW.

preferably, the target P-GW may also carry its own control plane address information in the response message and send it to the target S-GW.

Step 408: similar to the step 304a, and the difference is that, in this step, the target S-GW may return information of the target P-GW selected by itself, such as the identity of the target P-GW, the target P-GW's control plane address, and the uplink data channel address (user plane address) of the target P-GW and so on, to the target MME, and the target MME stores the information in the local.

Steps 409-415: the same as steps 305-311.

Step 416: the target MME sends the target S-GW a modify bearer request message carrying the information of the bearers that need to be modified;

step 417: the target S-GW sends the target P-GW a modify bearer request message carrying the information of the bearers that need to be modified;

preferably, the target S-GW in this step may assign a downlink data channel address used in the S-GW to the UE, and send the downlink data channel address information to the target P-GW via the above-mentioned request message, and the information is stored by the target P-GW. Therefore, in step 405, the target S-GW may not perform this operation.

Preferably, the target S-GW may send its own control plane address information to the target P-GW via the above request message in this step, and the information is stored by the target P-GW. Thus, in step 405, the target S-GW may not perform this operation.

Step 418: the target P-GW assigns a RID to the UE;

Step 419: the target P-GW sends a routing information update request to the source P-GW, and sends the assigned RID, the identity of UE and/or AID to the source P-GW;

step 419a: after the source P-GW receives the message sent by the target P-GW, it returns a routing information update acknowledge message to the target P-GW;

Similar to the principle in the step 315a, in this step, the source P-GW also needs to process the RID of UE. In this time, the downlink data transmission path is: Peer end->Source P-GW->Target P-GW->Target S-GW->Target eNodeB->UE; while the uplink data transmission path is: UE->Target eNodeB->Target S-GW->Source P-GW->Target P-GW->Peer end. For the downlink data, the source P-GW routes the data to the target P-GW according to the RID in this step; the target P-GW acquires the downlink data channel address in the target S-GW in step 405 or 417; the target S-GW in step 416 acquires the downlink data channel address in the target eNodeB; for the uplink data, the target eNodeB acquires the uplink data channel address in the target S-GW in step 409; the target S-GW acquires the uplink data channel address in the source P-GW in step 404; the source P-GW routes the data to the target P-GW according to the RID in this step.

Step 420: the target P-GW returns a modify bearer response message to the target S-GW, after receiving the message, the target S-GW directly sends the subsequent uplink data to the target P-GW;

Preferably, said target P-GW may also assign an uplink data channel address to the UE in this step, and return the assigned uplink data channel address information to the target S-GW via the modify bearer response message. Thus, in step 407, this operation does not need to be performed.

Preferably, the target P-GW may also return its own control plane address information to the target S-GW via this modify bearer response message in this step. Thus, in step 407, this operation does not need to be performed.

Step 421: the target S-GW returns a modify bearer response message to the target MME;

the target S-GW in this step may use the message to send information of the target P-GW, such as the identity of the target P-GW, the target P-GW's control plane address, and the uplink data channel address (user plane address) of the target P-GW and so on, to the target MME, and then the target MME stores the information in the local. Thus, said S-GW in step 408 may not carry the information in said create session response message to be returned to the target MME.

Steps 422-423: the same as steps 318-319.

This embodiment provides another example of an implementation of changing the P-GW to which the UE is currently attached in the S1 handover scenario, and this method can be used to solve a series of problems caused by the circuitous routing due to the existence of the fixed anchor point.

It should be noted that, after the target P-GW obtains said the complete context information of UE, said P-GW needs to create a context (wherein the abovementioned PDN connection information is stored) for the UE in the local and configures the obtained configuration information for the UE in the local and perform other operations, all of which need to cost a relatively long processing time period. Therefore, in the first embodiment, as described in step 315a, after the source P-GW returns said context response message to the target P-GW, the source P-GW needs to buffer the downlink and uplink data packets until the target P-GW receives the response and completes the related operations. Therefore, the source P-GW needs to buffer the uplink and downlink data in a relatively long period of time, which requires a relatively large buffer. In the second embodiment, the target P-GW obtains a series of information such as the context information and completes the corresponding operations in step 406a. When performing the step 419a, after the source P-GW sends the target P-GW the routing information update acknowledge message, it also needs to buffer said uplink and downlink data, however, since the time needed by the target P-GW to process the update acknowledge message is much less than the time required by said operation in step 315a, the source P-GW herein only needs to buffer the uplink and downlink data in a relatively short time, which only requires a small buffer, thus saving resource requirements of the source P-GW.

Therefore, by appropriately modifying the steps 315-315a in the first embodiment, the said P-GW and the source P-GW exchange the context information of UE, and at this moment the target P-GW does not send the RID to the source P-GW, and the source P-GW cannot process the RID, nor buffer the data; then, after the target P-GW processes information such as the context information, it notifies the RID to the source P-GW, and at this moment it is the same as the steps 419-419a, the source P-GW starts processing the RID. Therefore, said sources P-GW also only needs to buffer relatively small amount of uplink and downlink data.

From the view of the target P-GW obtaining the context information of UE, this embodiment is the PULL mode.

Third Embodiment

Figure 5:
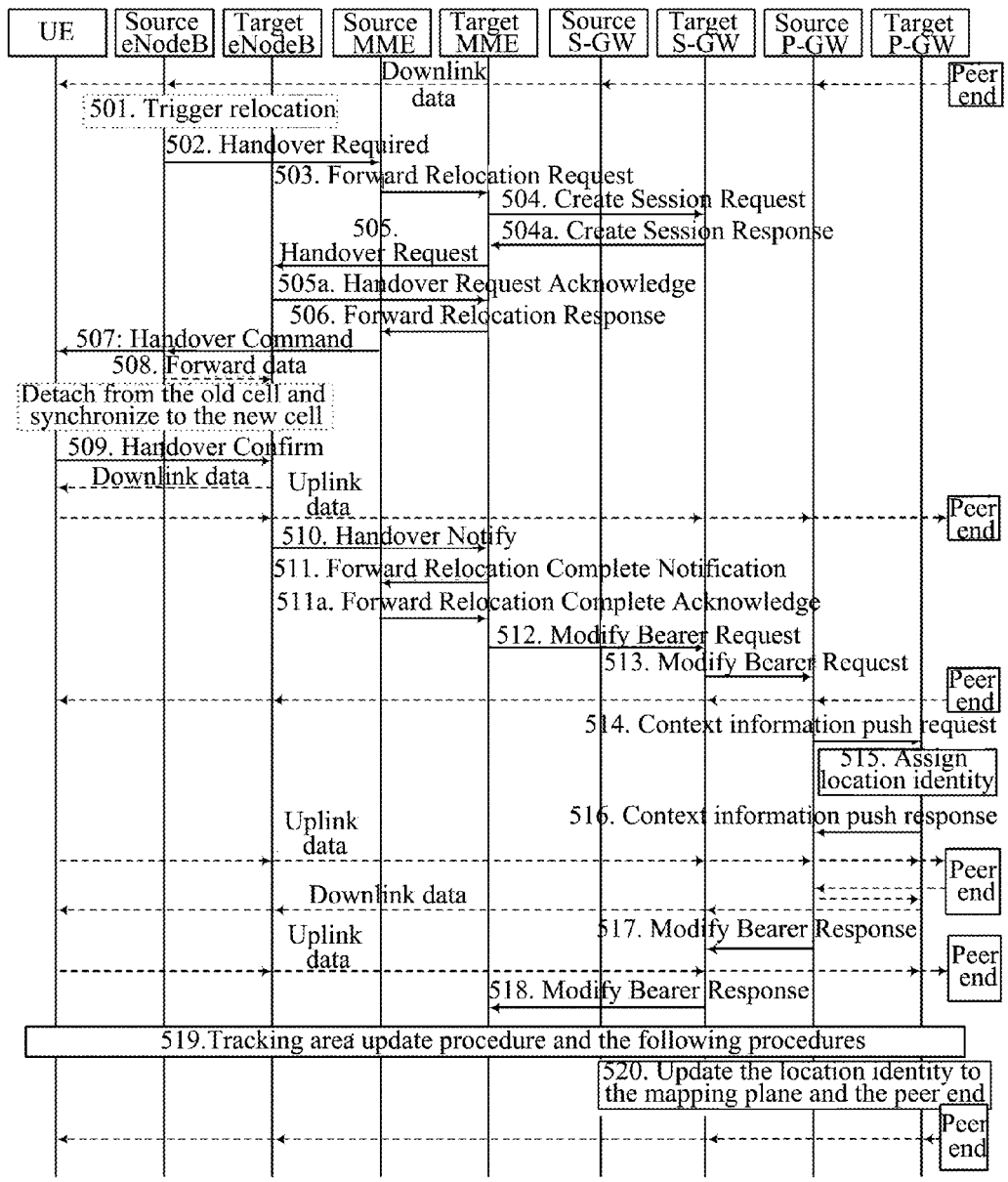
FIG. 5 is a flow chart of a third embodiment of achieving UE handover in accordance with the patent document.
Figure 6:
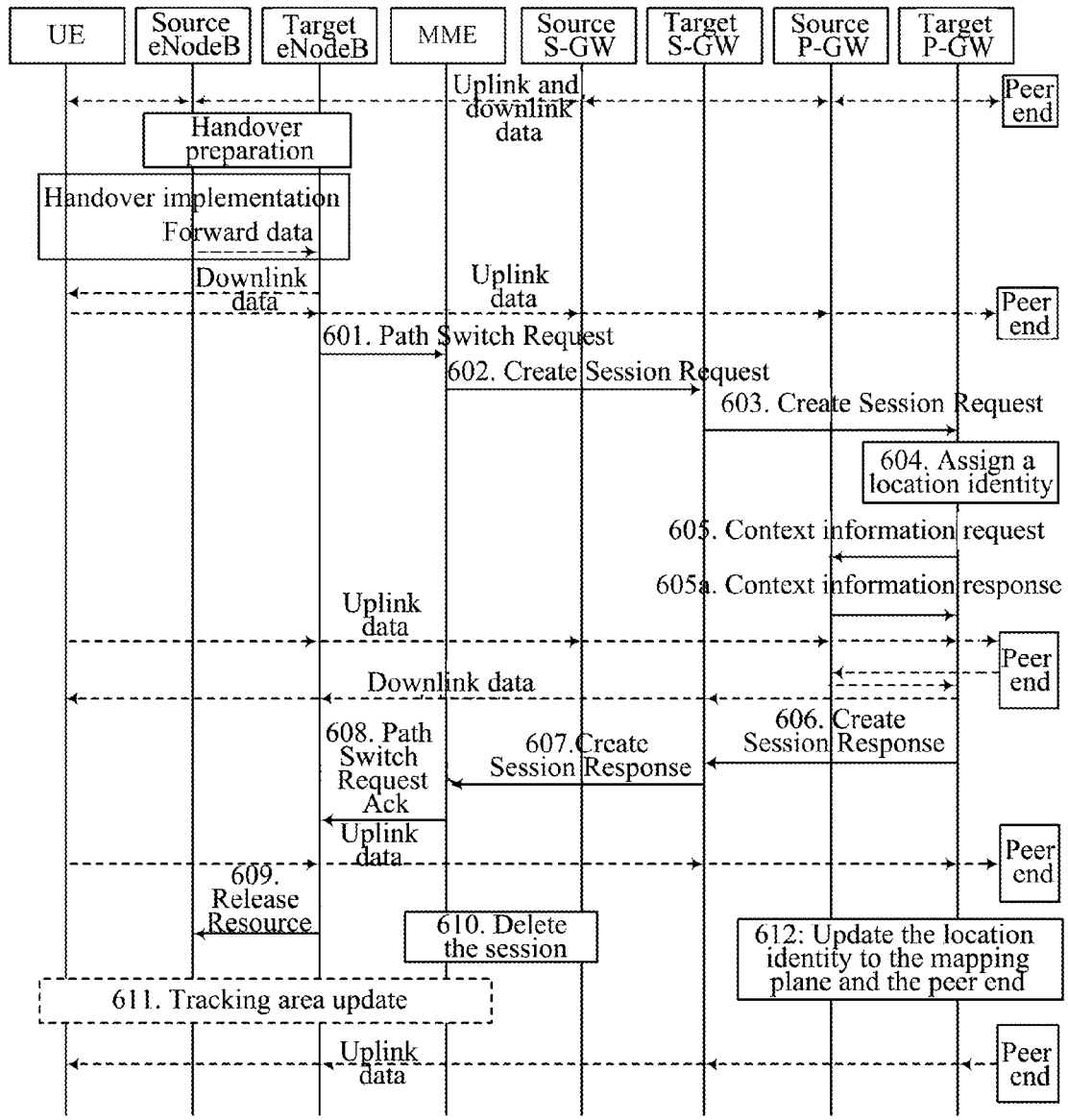
FIG. 6 is a flow chart of a fourth embodiment of achieving UE handover in accordance with the patent document.
Figure 7:
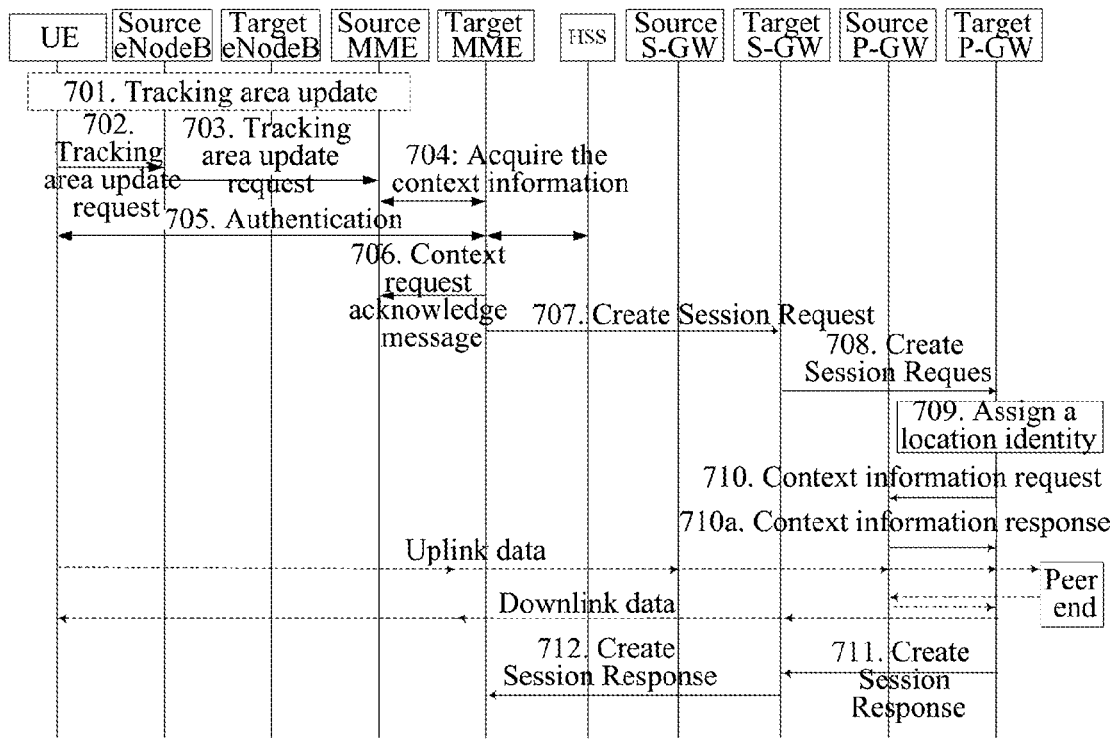
FIG. 7 is a flow chart of an embodiment of achieving tracking area update in accordance with the patent document.
Figure 8:
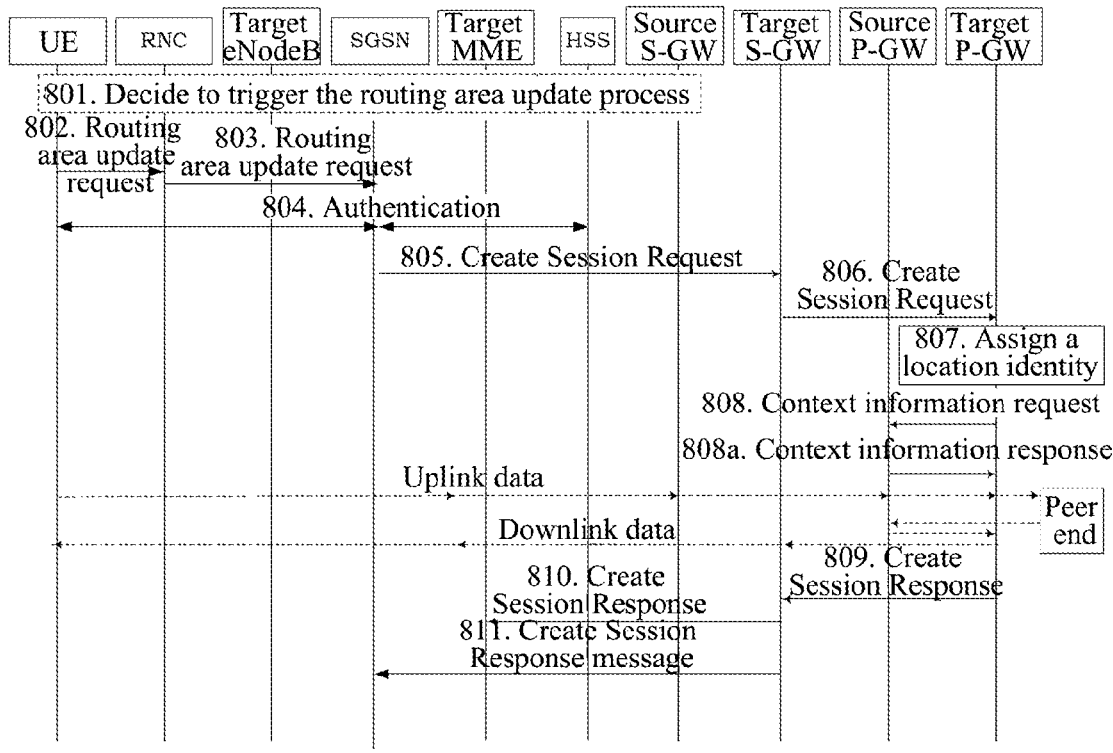
FIG. 8 is a flow chart of an embodiment of achieving routing area update in accordance with the patent document.

FIG. 5 shows a third embodiment of the present invention, and is also an example of changing the P-GW to which the UE is currently attached in the S1 handover scenario. It specifically comprises the following steps:

steps 501-512: the same as the steps 301-312;

step 513: the target S-GW sends a Modify Bearer Request message to the source P-GW;

The purpose of the message is to update the context information about UE stored in the source P-GW, and it needs to carry the downlink data channel address information assigned by the target S-GW to the UE to be used in the target S-GW, the control plane address information of S-GW, and the address information of the target P-GW.

It should be noted that, as described in the first two embodiments, the target P-GW may be selected by the target MME for the target S-GW, or selected by the target S-GW itself.

It also should be noted that, the target P-GW can also be selected by the source P-GW. For example, the source P-GW selects one P-GW closest to the target S-GW as the target P-GW according to the information implementing the configuration.

The downlink data transmission path at this time is: Peer end->Source P-GW->Target S-GW->Target eNodeB->UE. Wherein the source P-GW acquires the downlink data channel address in the target S-GW in step 513; the target S-GW acquires the downlink data channel address in the target eNodeB in step 512.

Step 514: the source P-GW sends a request message (such as a context information push request) carrying the context information of UE to the target P-GW, so as to trigger the target P-GW to create a context in the target P-GW for the UE;

The source P-GW needs to send the information of one or more bearer of UE to the target P-GW through said request message, and said bearer information includes (but not limited to) the EPS bearer ID, the bearer TFT, bearer level QoS, the downlink data channel address information assigned by the target S-GW to the UE (step 513) and so on. The source P-GW also sends the control plane address of target S-GW to the target P-GW.

The source P-GW needs to send the configuration information, the address/identity of the charging gateway, charging identity and other information described in step 315a to the target P-GW via the request message.

The source P-GW needs to send said identity of UE (such as IMSI) and the AID of UE to the target P-GW through the request message.

At this time, the target P-GW creates a context for the UE in the local, and stores the acquired bearer information of UE, the address/identity of charging gateway, and the charging identity and so on into the context information of UE. The target P-GW also needs to configure the corresponding information for the UE in the local (as described in step 315a).

Step 515: the target P-GW assigns a new RID to the UE, and stores the AID-RID mapping relationship in the local;

step 516: the target P-GW assigns an uplink data channel address to the UE, returns a response message (such as the context information push response) to the source P-GW, and sends the source P-GW the uplink data channel address information assigned to the UE;

the target P-GW needs to send its own control plane address information and the RID assigned to the UE to the source P-GW. The source P-GW stores the RID of UE in the local, and starts forwarding the uplink and downlink data to the target P-GW based on the RID. It should be noted that generally, in order to consider the precision requirements of charging, buffering the uplink and downlink data packets is started preferably when the source P-GW sends the context information push request to the target P-GW in the step 514, and the buffered and subsequently received data packets are forwarded to the target P-GW after receiving the RID.

In this case, the downlink data transmission path is: Peer end->source P-GW->Target P-GW->Target S-GW->Target eNodeB->UE; while the uplink data transmission path is: UE->Target eNodeB->Target S-GW->Source P-GW->Target P-GW->Peer end. For the downlink data, the source P-GW routes the data to the target P-GW according to the RID in this step; the target P-GW acquires the downlink data channel address in the target S-GW in step 514; the target S-GW acquires the downlink data channel address in the target eNodeB in step 512. For the uplink data, the target eNodeB acquires the uplink data channel address in the target S-GW in step 505; the target S-GW acquires the uplink data channel address in the source P-GW in step 504; the source P-GW routes the data to the target P-GW according to the RID in this step.

Step 517: the source P-GW returns a modify bearer response message to the target S-GW, and the message carries the uplink data channel address information assigned by the target P-GW to the UE;

the source P-GW also sends the control plane address information of target P-GW to the target S-GW through the message. After receiving the message, the target S-GW directly sends the uplink data to the target P-GW, and the transmission path is: UE->Target eNodeB->Target S-GW->Target P-GW->Peer end.

Steps 518-520: the same as steps 317-319.

From the view of obtaining the context information of UE from the target P-GW, this embodiment is a PUSH mode, and the source P-GW pushes the context information to the target P-GW.

Fourth Embodiment

The above three embodiments take the S1 handover scenario for example to describe the method for dynamically transferring the P-GW in the process of UE moving. In fact, in other mobility management scenarios, the above-mentioned method is also applicable. The X2 handover scenario will be taken as an example in the following, it specifically comprises the following steps:

before performing the X2 handover, the downlink and uplink data of UE is: UE<->source eNodeB<->Source S-GW<->source P-GW. Firstly the handover preparation stage and handover implementation stage between the UE and the eNodeB (Source eNodeB, target eNodeB) are executed, and the path of downlink data changes to: Source eNodeB->Target eNodeB->UE. Each following step can be viewed as a step in the handover completion stage.

Step 601: the target eNodeB sends a Path Switch Request message to the MME;

Step 602: the MME sends a request message to the target S-GW, the same as the step 404;

Step 603: the target S-GW sends a create session request to the target P-GW, the same as the step 313;

Step 604: the target P-GW assigns a new RID to the UE, the same as the step 314;

Step 605-605a: the target P-GW sends a context information request message to the source P-GW, and the source P-GW returns a context information request response message to the target P-GW, the same as the steps 315-315a;

the difference is that, the uplink data transmission path herein is: UE->Target eNodeB->Source S-GW->Source P-GW->Target P-GW->Peer end.

Step 606: the target P-GW returns a create session response message to the target S-GW, the same as the step 316;

The difference is that, the uplink data transmission path herein remains as: UE->Target eNodeB->Source S-GW->Source P-GW->Target P-GW->Peer end;

Step 607: the target S-GW returns a create session response message to the MME, the same as the step 408;

Step 608: the MME returns a Path Switch Request Ack message to the target eNodeB;

In this case, the uplink data transmission path is: UE->Target eNodeB->Target S-GW->Target P-GW->Peer end.

Step 609: The target eNodeB sends a Release Resource message to the source eNodeB;

Step 610: the resource release is executed between the MME and the source S-GW;

Step 611: the tracking area update process is performed;

Step 612: the new RID of UE is notified to the communicating peer end of the UE and to the ILR, the same as the step 319.

Similarly, in step 605, after the source P-GW receives the RID of UE, it needs to start buffering the context data, therefore, as described above, the source P-GW needs to buffer relatively a lot of data packets, which needs a relatively large buffer. Therefore, the modification of the steps 315-315a in the first embodiment is also applicable to the modification of the step 605-605a, the principle is the same, which is not repeated here.

Furthermore, the principle of the third embodiment can also be applied here, and herein the steps 603-606 are modified as the following steps:

step 603-1: the target S-GW sends a modify bearer request message to the source P-GW, the same as the step 513;

step 604-1: the source P-GW sends a context information push request message to the target P-GW, the same as the step 514;

step 605-1: the target P-GW assigns a new RID to the UE, and stores the mapping relationship of AID-RID in the local, the same as the step 515;

step 606-1: the target P-GW returns a context information push response to the source P-GW, the same as the step 516;

the difference is that, the uplink data transmission path herein is: UE->Target eNodeB->Source S-GW->Source P-GW->Target P-GW->Peer end.

Step 607-1: the source P-GW returns a modify bearer response message to the target S-GW, the same as the step 517.

The difference is that, the uplink data transmission path herein remains as: UE->Target eNodeB->Source S-GW->Source P-GW->Target P-GW->Peer end.

In the following, the procedures following the step 607 are performed, and the remaining principle is the same and not repeated here. It can be seen that for the S1 handover scenario, the same principle can be applied in the X2 handover scenario.

For the X2 handover, it can also be divided into PUSH and PULL modes.

In addition, the same principle can also be applied to the tracking area update scenario and the routing area update scenario, and as long as it relates to changing the S-GW to which the UE is currently connected, the method for the S1 handover scenario in the patent document can be utilized to achieve the purpose of changing the P-GW to which the UE is attached, whose principle is the same.

Fifth Embodiment

In the tracking area update scenario, it specifically comprises the following steps: step 701: the UE triggers a tracking area update process;

step 702: the UE sends a tracking area update request to the eNodeB;

Step 703: the eNodeB sends a tracking area update request to the target MME;

Step 704: the target MME acquires the context information of UE from the source MME. Preferably, the target MME can obtain the identity of UE from the source MME;

Step 705: the authentication is performed between the UE, the target MME and the HSS (Home Subscriber Server);

Step 706: the target MME returns a context request acknowledge message to the source MME;

Steps 707~712: the same as the steps 602-607;

Step 713: proceeding to the subsequent procedure;

As described above, the fifth embodiment is an example of the PULL mode. Of course, the embodiment can be appropriately modified, or transformed into an example of the PUSH mode, and the steps 708-711 are modified as the following steps:

Step 708-1: the same as the step 603-1;
Step 709-1: the same as the step 604-1;
Step 710-1: the same as the step 605-1;
Step 711-1: the same as the step 606-1;
Step 712-1: the same as the step 607-1;

The subsequent procedures following the step 712 are performed, and the remaining principle is the same and not repeated here.

Sixth Embodiment

In the routing area update scenario, it specifically comprises the following steps:

step 801: the UE works with the RNC (Radio Network Controller) and the eNodeB to decide triggering a routing area update process;

Step 802: the UE sends a routing area update request to the RNC, and the RNC further sends a routing area update request to the SGSN (Serving GPRS Support Node);

Step 803: the SGSN requests the context information of UE from the MME. Preferably, the SGSN acquires the identity of UE from the MME;

Step 804: the authentication is performed between the UE, SGSN and HSS;

Step 805: the SGSN sends a create session request to the target S-GW. Herein, similar to step 707, simply the network element MME (target MME) is changed to the network element SGSN;

steps 807 to 810: the same as steps 603-606;

Step 811: the target S-GW returns a create session response message to SGSN;

Step 812: proceeding to the subsequent procedure;

As described above, the sixth embodiment here is also an example of the PULL mode. Of course, the embodiment can be appropriately modified or transformed into an example of PUSH mode, and herein the steps 807-810 are modified as the following steps:

step 807-1: the same as the step 603-1;
step 808-1: the same as the step 604-1;
step 809-1: the same as the step 605-1;
step 810-1: the same as the step 606-1;
step 811-1: the same as the step 607-1;

The subsequent procedures following the step 811 are performed, and the remaining principle is the same and not repeated here.

Figure 9:
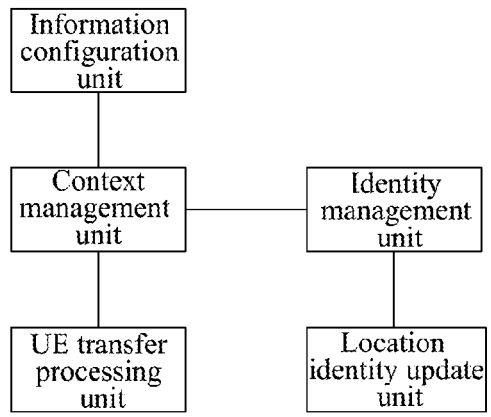
FIG. 9 is a structural diagram of a packet data network gateway in accordance with the patent document.

As shown in FIG. 9, the present embodiment also provides a packet data network gateway, comprising: a context management unit, an identity management unit, a location identity update unit, an information configuration unit and a UE transfer processing unit, wherein:

the context management unit is configured to: when a packet data network gateway (P-GW) is selected as the target P-GW of UE, create a context for the UE, store the context information of UE from the target serving gateway (S-GW) and the source P-GW to which the UE is currently attached;

the identity management unit is configured to assign a location identity including the routing information of UE to the UE.

The context information of UE comprises:

first context information, comprising a downlink data channel address assigned by the target S-GW to the UE and/or a control plane address of target S-GW;

second context information, comprising the packet data network (PDN) connection information of UE;

third context information, comprising the protocol configuration options (PCO) of UE and/or charging-related information.

The context management unit exchanges messages with the target S-GW and the source P-GW, to obtain the context information of UE from the target S-GW and the source P-GW, comprising:

the first context information being sent by the target S-GW to the context management unit;

the second context information being acquired by the context management unit from the source P-GW; alternatively, the second context information being sent by the target S-GW to the context management unit;

the third context information being obtained by the context management unit from the source P-GW.

The identity management unit is also configured to receive the identity of UE sent by the target S-GW to the identity management unit, or the identity management unit obtains the identity of UE from the source P-GW.

The context management unit is further configured to send information of the target P-GW to the target S-GW, wherein the information of the target P-GW comprises an uplink data channel address assigned by the target P-GW to the UE and/or the control plane address of target P-GW.

The context management unit obtains the context information of UE from the target S-GW and the source P-GW through the message interaction between the target S-GW and the source P-GW as well as between the source P-GW and the target P-GW, comprising that:

the first context information is sent by the target S-GW to the source P-GW, and then sent by the source P-GW to the context management unit;

the second context information is sent by the target S-GW to the source P-GW, and then sent by the source P-GW to the context management unit; alternatively, the second context information is sent by the source P-GW to the context management unit;

the third context information is sent by the source P-GW to the context management unit.

The identity management unit is also configured to receive the identity of UE sent by the source P-GW to the identity management unit.

The context management unit is further configured to send the information of target P-GW to the source P-GW, and then the source P-GW sends the information of target P-GW to the target S-GW, wherein, the information of target P-GW comprises the uplink data channel address assigned by the target P-GW to the UE and/or the control plane address of target P-GW.

The message interaction between the context management unit and the target S-GW and the source P-GW comprises:

the target S-GW sends the context management unit a first request for creating a session for the UE, and triggers the context management unit to create a context for the UE, and said first request carries address information of the source P-GW;

after the context management unit receives said first request, it sends the source P-GW a second request for the context information of UE;

after the context management unit receives a second response for the context information of UE returned by the source P-GW, it returns a first response to creates a session for the UE to the target S-GW.

The identity management unit assigns a location identity to the UE after the context management unit receives the first request, and the identity management unit also sends said location identity to the source P-GW in the following manner:

the identity management unit carries the location identity in the second request sent by the context management unit; or the identity management unit sends the source P-GW a request for updating the routing information of UE after the context management unit receives the second response, and the request carries the location identity.

The message interaction between the context management unit and the target S-GW and the source P-GW comprises that:

the target S-GW sends the context management unit a first request for creating a session for the UE, triggers the context management unit to create a context for the UE, wherein said first request carries address information of the source P-GW;

after the context management unit receives the first request, it sends the source P-GW a second request for the context information of UE;

after the context management unit receives a second response for the context information of UE returned by the source P-GW, it returns a first response to create a session for the UE to the target S-GW;

the target S-GW sends a third request for modifying bearers for the UE to the identity management unit;

after the identity management unit receives said third request, it sends the source P-GW a fourth request for updating routing information for UE, and said request carries the location identity;

after the identity management unit receives a fourth response for updating routing information for UE returned by the source P-GW, it returns a third response for modifying the bearers for UE to the target S-GW.

The message interaction between the target S-GW and the source P-GW as well as between the source P-GW and the context management unit comprises that:

the target S-GW sends the source P-GW a first request for modifying bearers for UE;

after the source P-GW receives said first request, it sends the context management unit a second request for pushing the context information of UE, and triggers the context management unit to create a context for the UE;

after the context management unit receives said second request, it returns a second response for pushing the context information of UE to the source P-GW;

after the source P-GW receives said second response, it returns a first response for modifying bearers for the UE to the target S-GW.

The identity management unit assigns a location identity to the UE after the context management unit receives the second request, and sends said location identity to the source P-GW via the second response.

The location identity update unit is configured to notify the location identity to a communicating peer end of UE and/or an identity location register for storing the mapping relationship.

The location identity including the routing information of UE is used to locate the location identity of target P-GW.

The information configuration unit is configured to: after the context management unit receives the context information of UE, also configure configuration information for the UE locally, and said configuration information comprises configuration information that the UE exchanges with the source P-GW via the PCO, or configuration information obtained from another source P-GW when the source P-GW works as the target P-GW.

The UE transfer processing unit is configured to: when the packet data network gateway (P-GW) works as the source P-GW of UE, provide the third context information to the target P-GW; or provide the second context information and the third context information to the target P-GW; or provide the first context information, the second context information and the third context information to the target P-GW.

Figure 10:
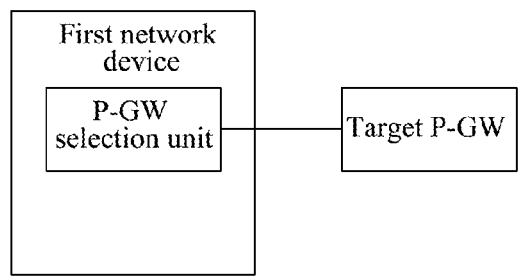
FIG. 10 is a structural diagram of a UE mobility management system in accordance with the patent document.

As shown in FIG. 10, the present embodiment also provides a UE mobility management system, comprising: a first network device and a target P-GW, wherein said first network device comprises a P-GW selection unit, wherein:

said P-GW selection unit is configured to select a target P-GW for UE in a process of UE moving;

the target P-GW uses any one of the P-GWs in claims 1~19.

The first network device is the target S-GW; or a mobility management entity (MME) or a serving GPRS support node (SGSN); the MME or SGSN further comprises an address information transmission unit which is configured to send the address information of target P-GW to the target S-GW.

The first network device is the source P-GW; or a target S-GW, and the target S-GW further comprises an address information transmission unit, and said address information transmission unit is configured to send the address information of target P-GW to the source P-GW; or the first network device is a MME or SGSN, the MME or SGSN further comprises an address information transmission unit, and said address information transmission unit is configured to send the address information of target P-GW to the source P-GW via the target S-GW.

Figure 11:
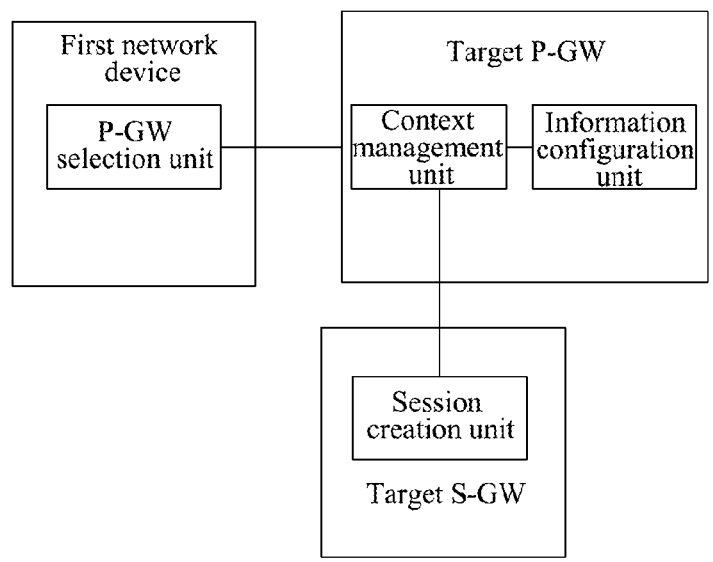
FIG. 11 is a structural diagram of a system for creating a context for the UE in accordance with the patent document.

As shown in FIG. 11, the present embodiment also provides a system for creating a context for UE, comprising: a first network device, a target S-GW and a target P-GW, wherein said first network device comprises a P-GW selection unit, and the target S-GW comprises a session creation unit, and the target P-GW comprises a context management unit, wherein:

said P-GW selection unit is configured to select a target P-GW for the UE in a process of UE moving;

said session creation unit is configured to send a first request to the context management unit, and said first request carries first context information of UE and the address information of the source P-GW to which the UE is currently attached;

the context management unit is configured to: after receiving the first request, create a context for the UE and store the context information of UE, and the context information of UE comprises first context information and second context information that the context management unit obtains from the source P-GW.

The first context information comprises a downlink data channel address assigned by the target S-GW to the UE and/or a control plane address of the target S-GW; the second context information comprises charging-related information and/or protocol configuration options of UE.

The context management unit obtains the second context information from the source P-GW, comprising that:

after the context management unit receives the first request, it sends the source P-GW a second request for the context information of UE;

after the source P-GW receives said second request, it returns a second response for the context information of UE to the context management unit, and said response carries second context information of the UE.

The session creation unit sends the context management unit a request for creating a session for the UE, which is triggered in the following situations:

a S1 handover occurs in a process of UE moving, and in the process of S1 handover, the session creation unit receives a modify bearer request sent by the MME of UE;

a S1 handover occurs in a process of UE moving, and in the process of S1 handover, the session creation unit receives a create session request sent by the MME of UE;

a X2 handover occurs in a process of UE moving, and in the completion stage of X2 handover, the session creation unit receives a create session request sent by the MME of UE;

a routing area update occurs in a process of UE moving, and in the process of routing area update, the session creation unit receives a create session request sent by the MME of UE;

a tracking area update occurs during a process of UE moving, and in the process of tracking area update, the session creation unit receives a create session request sent by the SGSN of UE.

The target P-GW further comprises an information configuration unit, wherein: said information configuration unit is configured to: after the context management unit obtains the second context information from the source P-GW, configure configuration information for the UE locally, and the configuration information comprises configuration information that the UE exchanges with the source P-GW via the PCO, or configuration information obtained from another source P-GW when the source P-GW works as the target P-GW.

The first context information or second context information further comprises packet data network (PDN) connection information of UE.

Figure 12:
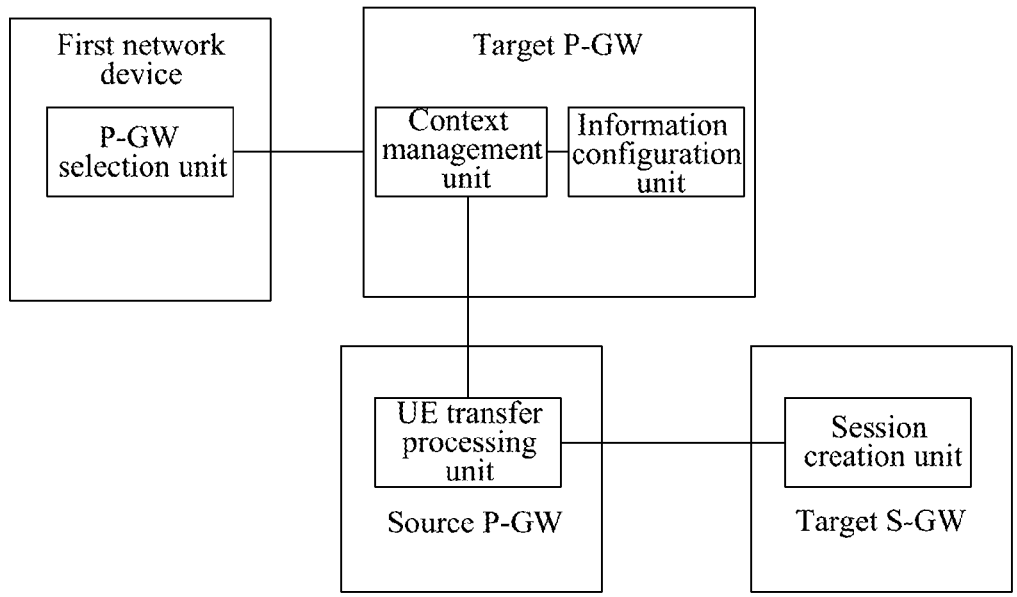
FIG. 12 is a structural diagram of another system for creating a context for the UE in accordance with the patent document.

As shown in FIG. 12, the present embodiment provides another system for creating a context for UE, comprising: a first network device, a target S-GW, a source P-GW and a target P-GW, wherein said first network device comprises a P-GW selection unit, the target S-GW comprises a session modification device, the target P-GW comprises a context management unit, and the source P-GW comprises a UE transfer processing unit, wherein:

said P-GW selection unit is configured to select a target P-GW for the UE in a process of UE moving;

said session modification unit is configured to send a request for modifying bearers for the UE to the UE transfer processing unit in the source P-GW to which the UE is currently attached, and said request carries first context information of UE;

the UE transfer processing unit is configured to: after receiving the request for modifying bearers for the UE, send a first request to the context management unit in the target P-GW, and said request also carries second context information of UE besides the first context information;

the context management unit is configured to: after receiving the first request, create a context for the UE, and store the first context information and second context information of UE.

The first context information comprises the downlink data channel address assigned by the target S-GW to the UE and/or a control plane address of target S-GW;

the second context information comprises protocol configuration options of UE and/or the charging-related information.

The session modification unit sends the UE transfer processing unit a request for modifying bearers for the UE, which is triggered in the following situations:

a S1 handover occurs in a process of UE moving, and in the process of S1 handover, the session modification unit receives a modify bearer request sent by the MME of UE;

a X2 handover occurs in a process of UE moving, and in the completion stage of X2 handover, the session modification unit receives a create session request sent by the MME of UE;

a routing area update occurs in a process of UE moving, and in the process of routing area update, the session modification unit receives a create session request sent by the MME of UE;

a tracking area update occurs in a process of UE moving, and in the process of tracking area update, the session modification unit receives a create session request sent by the SGSN of UE.

The target P-GW further comprises an information configuration unit, wherein: said configuration information unit is configured to: after obtaining the second context information from the UE transfer processing unit, configure configuration information for the UE in the local, and the configuration information comprises configuration information that the UE exchanges with the source P-GW via the PCO, or configuration information obtained from another source P-GW when the source P-GW works as the target P-GW.

The first context information or the second context information further comprises packet data network (PDN) connection information of UE.

Figure 13:
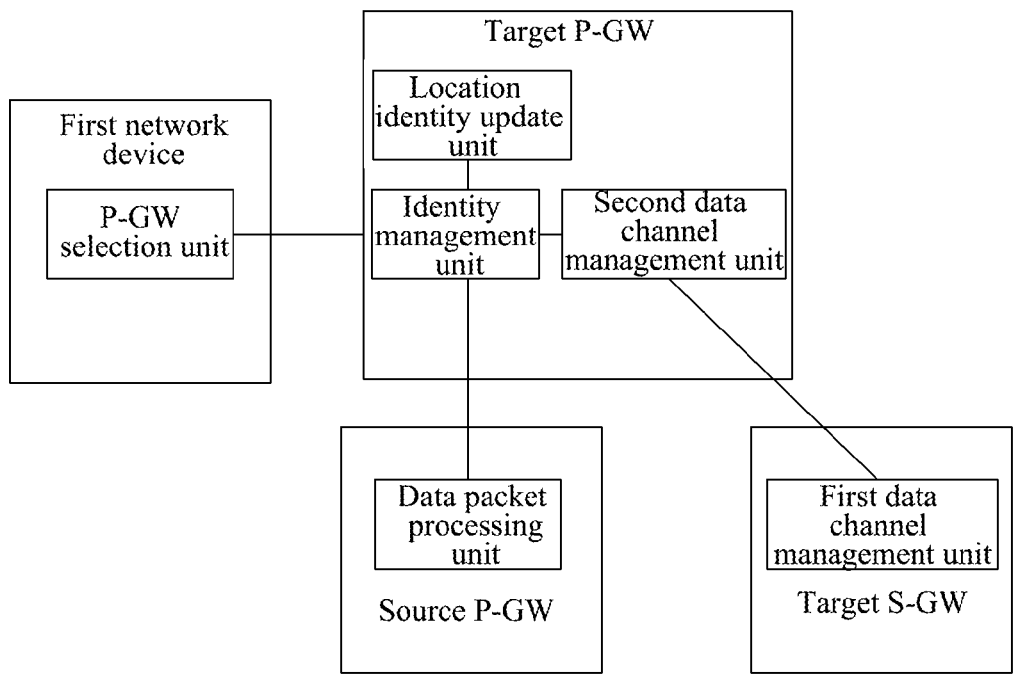
FIG. 13 is a structural diagram of a system for establishing a data channel for the UE in accordance with the patent document.

As shown in FIG. 13, the present embodiment also provides a system for establishing a data channel for the UE, comprising: a first network device, a target S-GW and a target P-GW, wherein said first network device comprises a P-GW selection unit, the target S-GW comprises a first data channel management unit, and the target P-GW comprises an identity management unit and a second data channel management unit, wherein:

said P-GW selection unit is configured to select the target P-GW for the UE in a process of UE moving;

said first data channel management unit is configured to assign a downlink data channel address to the UE, and send said downlink data channel address to said second data channel management unit;

the identity management unit is configured to assign a location identity containing the routing information of UE to the UE, and send said location identity to the source P-GW to which the UE is currently attached;

said second data channel management unit is configured to assign an uplink data channel address to the UE, and send said uplink data channel address to the first data channel management unit.

The first data channel management unit sends the downlink data channel address to the second data channel management unit, comprising: the request for creating a session for the UE or request for modifying bearers for the UE sent by the first data channel management unit to the second data channel management unit carries the downlink data channel address;

the second data channel management unit sends the uplink data channel address to the first data channel management unit, comprising: the response for creating a session for the UE or response for modifying the bearers for the UE returned by the second data channel management unit to the first data channel management unit carries the uplink data channel address.

After the second data channel management unit receives the request for creating a session for the UE or the request for modifying bearers for the UE, the identity management unit assigns a location identity to the UE;

the identity management unit sends the location identity to the source P-GW, comprising that:

after said second data channel management unit receives the request for creating a session for the UE, the identity management unit sends the source P-GW a request for the context information of UE, and said request carries the location identity; or after the second data channel management unit receives the request for creating a session for the UE, the identity management unit first obtains the context information of UE from the source P-GW and then sends the location identity to the source P-GW; or after the second data channel management unit receives the request for modifying bearers for the UE, the identity management unit sends the source P-GW a request for updating routing information of UE, and said request carries the location identity.

The first data channel management unit sends the downlink data channel address to the second data channel management unit, comprising that: the first data channel management unit sends the source P-GW a request for modifying bearers for the UE, and the source P-GW sends the second data channel management unit a request for pushing context information for the UE, and both requests carry the downlink data channel address;

the second data channel management unit sends said uplink data channel address to the first data channel management unit, comprising that: the second data channel management unit returns a response for pushing context information for the UE to the source P-GW, and the source P-GW returns a response for modifying bearers for the UE to the first data channel management unit, and both responses carry the uplink data channel address.

After the second data channel management unit receives the request for pushing context information for the UE, the identity management unit assigns a location identity to the UE;

the identity management unit sends the location identity to the source P-GW, comprising that:

after the second data channel management unit receives the request for pushing context information for the UE, the identity management unit carries the location identity in the response for pushing the context information returned to the source P-GW.

The source P-GW comprises a data packet processing unit, wherein: said data packet processing unit is configured to: after receiving the location identity, if the uplink or downlink data packets of UE are received, forward the uplink or downlink data packets of UE to the target P-GW according to the location identity. Alternatively, the data packet processing unit is configured to: after sending the target P-GW the request for pushing the context information for the UE, if the uplink or downlink data packets of UE are received, buffer the data packets, and after receiving the location identity, send the uplink or downlink data packets of UE to the target P-GW according to the location identity.

The location identity containing the routing information of UE is used to locate the location identity of target P-GW.

The target P-GW further comprises a location identity update unit, and said location identity update unit is configured to notify the location identity to a communicating peer end of UE and/or the identity location register for storing the mapping relationship; or the source P-GW comprises a location identity update unit, and said location identity update unit is configured to: after receiving the location identity, notify the location identity to a communicating peer end of UE and/or the identity location register for storing the mapping relationship.

Those ordinarily skilled in the art can understand that all or some of steps of the above-mentioned method may be completed by the programs instructing the relevant hardware, and said programs may be stored in a computer-readable storage medium, such as read only memory, magnetic or optical disk. Optionally, all or some of the steps of the above-mentioned embodiments may also be implemented by using one or more integrated circuits. Accordingly, each apparatus/module/unit in the above-mentioned embodiment may be realized in the form of hardware or software function module. The patent document is not limited to any specific form of combination of hardware and software.

The above description is only preferred embodiments of the present invention, and is not intended to limit the patent document. For those skilled in the field, the patent document may have a variety of changes and modifications, and without departing from the spirit and principle of the patent document, all changes, equivalent replacements and improvements should be included within the protection scope of the patent document.

INDUSTRIAL APPLICABILITY

The embodiment of the present invention re-selects a P-GW to which the UE is attached, so as to eliminate the circuitous routing in the process of the UE connecting and using a service, save transmission bearer resources, reduce transmission delay of data packet, and ensure that after the attached P-GW changes, the UE is still reachable, and the UE and its peer end cannot have a perception in the IP level that the UE moves.

What is claimed is:

1. A packet data network gateway, comprising hardware configured to execute instructions stored in a non-transitory computer readable medium to perform steps in following units: a context management unit and an identity management unit, wherein:

the context management unit is configured to: when said packet data network gateway (P-GW) is selected as a target P-GW of a user equipment (UE), create a context for the UE, and store context information of the UE from a target serving gateway (S-GW) and a source P-GW to which the UE is currently attached;

the identity management unit is configured to: assign a location identity including routing information of the UE for the UE;

wherein the context information of the UE comprises:

first context information, comprising a downlink data channel address that the target S-GW assigns to the UE and/or a control plane address of the target S-GW;

second context information, comprising packet data network (PDN) connection information of the UE;

third context information, comprising charging-related information and/or protocol configuration options (PCO) of the UE.

2. The P-GW of claim 1, wherein, the context management unit exchanges messages with the target S-GW and the source P-GW to obtain the context information of the UE from the target S-GW and the source P-GW, comprising:

said first context information being sent by the target S-GW to the context management unit;

said second context information being obtained by the context management unit from the source P-GW; alternatively, said second context information being sent by the target S-GW to the context management unit;

said third context information being obtained by the context management unit from the source P-GW, wherein the identity management unit is further configured to receive an identity of the UE sent by the target S-GW to the identity management unit, or the identity management unit acquires an identity of the UE from the source P-GW; or the context management unit is further configured to send information of the target P-GW to the target S-GW, wherein, the information of the target P-GW comprises an uplink data channel address that the target P-GW assigns to the UE and/or a control plane address of the target P-GW.

3. The P-GW of claim 1, wherein, the context management unit is configured to: obtain the context information of the UE from the target S-GW and the source P-GW through message interaction between the target S-GW and the source P-GW as well as between the source P-GW and the target P-GW, comprising:

said first context information being sent by the target S-GW to the source P-GW, and then sent by the source P-GW to the context management unit;

said second context information being sent by the target S-GW to the source P-GW, and then sent by the source P-GW to the context management unit; alternatively, said second context information being sent by the source P-GW to the context management unit;

said third context information being sent by the source P-GW to the context management unit, wherein the identity management unit is further configured to: receive an identity of the UE sent by the source P-GW to the identity management unit; or the context management unit is further configured to: send information of the target P-GW to the source P-GW, and then the source P-GW sending the information of the target P-GW to the target S-GW, wherein, the information of the target P-GW comprises an uplink data channel address that the target P-GW assigns to the UE and/or a control plane address of the target P-GW.

4. The P-GW of claim 1, wherein, the context management unit exchanging messages with the target S-GW and the source P-GW comprises:

the target S-GW sending the context management unit a first request for creating a session for the UE, triggering the context management unit to create the context for the UE, said first request carrying address information of the source P-GW;

after the context management unit receives said first request, sending the source P-GW a second request for the context information of the UE;

after the context management unit receives a second response for the context information of the UE returned by the source P-GW, returning a first response for creating a session for the UE to the target S-GW, wherein the identity management unit is further configured to: assign a location identity to the UE after the context management unit receives said first request, and send said location identity to the source P-GW in a following manner:

carrying said location identity in said second request sent by the context management unit; or sending the source P-GW a request for updating the routing information of the UE after the context management unit receives said second response, wherein, said request carries said location identity.

5. The P-GW of claim 1, wherein, the context management unit exchanging messages with the target S-GW and the source P-GW comprises:

the target S-GW sending the context management unit a first request for creating a session for the UE, triggering the context management unit to create the context for the UE, wherein said first request carries address information of the source P-GW;

after the context management unit receives said first request, sending the source P-GW a second request for the context information of the UE;

after the context management unit receives a second response for the context information of the UE returned by the source P-GW, returning a first response for creating a session for the UE to the target S-GW;

the target S-GW sending a third request for modifying bearers of the UE to the identity management unit;

after the identity management unit receives said third request, sending the source P-GW a fourth request for updating the routing information for the UE, wherein the fourth request carries the location identity;

after the identity management unit receives a fourth response for updating the routing information for the UE returned by the source P-GW, returning a third response for modifying bearers for the UE to the target S-GW;

or wherein, the message interaction between the target S-GW and the source P-GW as well as between the source P-GW and the context management unit comprises:

the target S-GW sending the source P-GW a first request for modifying bearers for the UE;

after the source P-GW receives the first request, sending the context management unit a second request for pushing the context information of the UE, triggering the context management unit to create the context for the UE;

after the context management unit receives said second request, returning a second response for pushing the context information of the UE to the source P-GW;

after the source P-GW receives said second response, returning a first response for modifying bearers for the UE to the target S-GW, wherein the message interaction between the target S-GW and the source P-GW as well as between the source P-GW and the context management unit comprises:

the target S-GW sending the source P-GW a first request for modifying bearers for the UE;

after the source P-GW receives the first request, sending the context management unit a second request for pushing the context information of the UE, and triggering the context management unit to create the context for the UE;

after the context management unit receives said second request, returning a second response for pushing the context information of the UE to the source P-GW;

after the source P-GW receives said second response, returning a first response for modifying bearers for the UE to the target S-GW.

6. The P-GW of claim 1, wherein, the hardware in the P-GW is further configured to execute instructions stored in the non-transitory computer readable medium to perform steps in a location identity update unit, and said location identity update unit is configured to: notify said location identity to a communicating peer end of the UE and/or an identity location register for storing said mapping relationship;

or wherein, said location identity including routing information of the UE is used to locate a location identity of the target P-GW.

7. The P-GW of claim 1, wherein, the hardware in the P-GW is further configured to execute instructions stored in the non-transitory computer readable medium to perform steps in an information configuration unit, wherein, said information configuration unit is configured to: after the context management unit receives the context information of the UE, configure configuration information for the UE locally, wherein said configuration information comprises configuration information that the UE exchanges with the source P-GW via the PCO, or configuration information obtained from another source P-GW when the source P-GW works as the target P-GW;

or the hardware in the P-GW is further configured to execute instructions stored in the non-transitory computer readable medium to perform steps in a UE transfer processing unit, wherein, said UE transfer processing unit is configured to: when said packet data network gateway (P-GW) works as a source P-GW of the UE, provide said third context information to a target P-GW; or provide said second context information and said third context information to a target P-GW; or provide said first context information, said second context information and said third context information to the target P-GW.

8. A user equipment (UE) mobility management system, comprising: a first network device and a target packet data network gateway (P-GW), wherein said first network device comprises hardware configured to execute instructions stored in a non-transitory computer readable medium to perform steps in a P-GW selection unit, wherein:

said P-GW selection unit is configured to: select a target P-GW for UE in a process of the UE moving;

the target P-GW using said P-GW in claim 1, wherein said first network device is a target S-GW; or a mobility management entity (MME) or a serving GPRS support node (SGSN); the hardware in the MME or SGSN is further configured to execute instructions stored in the non-transitory computer readable medium to perform steps in an address information transmission unit, and said address information transmission unit is configured to: send address information of the target P-GW to the target S-GW;

or said first network device is a source P-GW, or the target S-GW, and the hardware in the target S-GW is further configured to execute instructions stored in the non-transitory computer readable medium to perform steps in an address information transmission unit, and said address information transmission unit is configured to: send address information of the target P-GW to the source P-GW; or said first network device is a MME or SGSN, and the hardware in the MME or SGSN is further configured to execute instructions stored in the non-transitory computer readable medium to perform steps in an address information transmission unit, and said address information sending unit is configured to: send address information of the target P-GW to the source P-GW via the target S-GW.

9. A system for creating a context for a user equipment, comprising: a first network device, a target serving gateway (S-GW) and a target packet data network gateway (P-GW), wherein, said first network device comprises hardware configured to execute instructions stored in a non-transitory computer readable medium to perform steps in a P-GW selection unit, the target S-GW comprises hardware configured to execute instructions stored in a non-transitory computer readable medium to perform steps in a session creation unit, and the target P-GW is a P-GW as defined in claim 1, wherein:

said P-GW selection unit is configured to select a target P-GW for the UE in a process of the UE moving;

said session creation unit is configured to send a first request to the context management unit, wherein said first request carries the first context information of the UE and address information of a source P-GW to which the UE is currently attached;

the context management unit in the target P-GW is configured to: after receiving the first request, create a context for the UE and store context information of the UE, wherein the context information of the UE comprises the first context information and the third context information that the context management unit obtains from the source P-GW.

10. The system of claim 9, wherein, wherein the hardware in the target P-GW is further configured to execute instructions stored in the non-transitory computer readable medium to perform steps in an information configuration unit, wherein: said information configuration unit is configured to: after the context management unit obtains the third context information from the source P-GW, configure configuration information for the UE locally, wherein the configuration information comprises configuration information that the UE exchanges with the source P-GW via the PCO, or configuration information obtained from another source P-GW when the source P-GW works as the target P-GW;

or said first context information or said third context information further comprises packet data network (PDN) connection information of the UE.

11. The system of claim 9, wherein, the context management unit obtains the third context information from the source P-GW, comprising:

after the context management unit receives the first request, sending the source P-GW a second request for the context information of the UE;

after the source P-GW receives said second request, returning a second response for the context information of the UE to the context management unit, wherein the second response carries the third context information of the UE;

or said session creation unit is configured to: send the context management unit a request to create a session for the UE, which is triggered in following situations:

a S1 handover occurring in a process of the UE moving, and in a process of the S1 handover, the session creation unit receiving a modify bearer request sent by a MME of the UE;

a S1 handover occurring in a process of the UE moving, and in a process of the S1 handover, the session creation unit receiving a create session request sent by the MME of the UE;

a X2 handover occurring in a process of the UE moving, and in a completion stage of the X2 handover, the session creation unit receiving a create session request sent by the MME of the UE;

a routing area update occurring in a process of the UE moving, and in a process of said routing area update, the session creation unit receiving a create session request sent by the MME of the UE;

a tracking area update occurring in a process of the UE moving, and in a process of said tracking area update, the session creation unit receiving a create session request sent by a SGSN of the UE.

12. A system for creating a context for a user equipment (UE), comprising: a first network device, a target serving gateway (S-GW), a source packet data network gateway (P-GW) and a target P-GW, wherein said first network device comprises hardware configured to execute instructions stored in a non-transitory computer readable medium to perform steps in a P-GW selection unit, the target S-GW comprises hardware configured to execute instructions stored in a non-transitory computer readable medium to perform steps in a session modification device, the target P-GW is a P-GW as defined in claim 1, and the source P-GW comprises hardware configured to execute instructions stored in a non-transitory computer readable medium to perform steps in a UE transfer processing unit, wherein:

said P-GW selection unit is configured to select the target P-GW for UE in a process of the UE moving;

said session modification unit is configured to send a request for modifying bearers for the UE to a UE transfer processing unit in a source P-GW to which the UE is currently attached, wherein said request carries the first context information of the UE;

the UE transfer processing unit is configured to: after receiving the request for modifying bearers for the UE, send a first request to the context management unit in the target P-GW, wherein said first request also carries the third context information of the UE besides the first context information;

the context management unit in the target P-GW is configured to: after receiving the first request, create a context for the UE, and store the first context information and the third context information of the UE.

13. The system of claim 12, wherein, wherein the hardware in the target P-GW is further configured to execute instructions stored in the non-transitory computer readable medium to perform steps in an information configuration unit, wherein: said information configuration unit is configured to: after obtaining the third context information from the UE transfer processing unit, configure configuration information for the UE locally, wherein the configuration information comprises configuration information that the UE exchanges with the source P-GW via the PCO, or configuration information obtained from another source P-GW when the source P-GW works as the target P-GW.

14. The system of claim 12, wherein, said session modification unit is configured to: send said UE transfer processing unit the request for modifying bearers for the UE, which is triggered in following situations:

a S1 handover occurring in a process of the UE moving, and in a process of said S1 handover, said session modification unit receiving a modify bearer request sent by a MME of the UE;

a X2 handover occurring in a process of the UE moving, and in a completion stage of said X2 handover, said session modification unit receiving a create session request sent by the MME of the UE;

a routing area update occurring in a process of the UE moving, and in a process of said routing area update, said session modification unit receiving a create session request sent by the MME of the UE;

a tracking area update occurring in a process of the UE moving, and in a process of said tracking area update, said session modification unit receiving a create session request sent by a SGSN of the UE;

or wherein, said first context information or said third context information further comprises packet data network (PDN) connection information of the UE.

15. A system for establishing a data channel for a user equipment (UE), comprising: a first network device, a target serving gateway (S-GW) and a target packet data network gateway (P-GW), wherein said first network device comprises hardware configured to execute instructions stored in a non-transitory computer readable medium to perform steps in a P-GW selection unit, the target S-GW comprises hardware configured to execute instructions stored in a non-transitory computer readable medium to perform steps in a first data channel management unit, and the target P-GW is a P-GW as defined in claim 1 and the hardware in the target P-GW is further configured to execute instructions stored in the non-transitory computer readable medium to perform steps in a second data channel management unit, wherein:

said P-GW selection unit is configured to select the target P-GW for a UE in a process of the UE moving;

said first data channel management unit is configured to assign a downlink data channel address to the UE, and send said downlink data channel address to said second data channel management unit;

the identity management unit in the target P-GW is configured to assign a location identity containing routing information of UE to the UE, and send said location identity to a source P-GW to which the UE is currently attached;

said second data channel management unit is configured to assign an uplink data channel address to the UE, and send said uplink data channel address to the first data channel management unit.

16. The system of claim 15, wherein, said first data channel management unit is further configured to: send said downlink data channel address to said second data channel management unit, comprising: said first data channel management unit carrying said downlink data channel address in a request for creating a session for the UE or request for modifying bearers for the UE sent to said second data channel management unit;

said second data channel management unit is further configured to: send said uplink data channel address to said first data channel management unit, comprising: said second data channel management unit carrying said uplink data channel address in a response for creating a session for the UE or response for modifying bearers for the UE returned to said first data channel management unit.

17. The system of claim 16, wherein, the identity management unit is configured to: after said second data channel management unit receives said request for creating a session for the UE or request for modifying bearers for the UE, assign the location identity to the UE;

the identity management unit is configured to: send said location identity to the source P-GW, comprising:

after said second data channel management unit receives the request for creating a session for the UE, the identity management unit sending the source P-GW a request for context information of the UE, wherein said request carries the location identity; or after the second data channel management unit receives the request for creating a session for the UE, the identity management unit first obtaining context information of the UE from the source P-GW and then sending the location identity to the source P-GW; or after the second data channel management unit receives the request for modifying bearers for the UE, the identity management unit sends the source P-GW a request for updating the routing information of the UE, wherein said request carries the location identity, wherein the source P-GW comprises hardware configured to execute instructions stored in a non-transitory computer readable medium to perform steps in a data packet processing unit, wherein: said data packet processing unit is configured to: after receiving said location identity, if uplink or downlink data packets of the UE are received, forward the uplink or downlink data packets of the UE to the target P-GW according to the location identity;

or the hardware in the target P-GW is further configured to execute instructions stored in the non-transitory computer readable medium to perform steps in a location identity update unit, and said location identity update unit is configured to notify said location identity to a communicating peer end of the UE and/or an identity location register for storing the mapping relationship; or the source P-GW comprises hardware configured to execute instructions stored in a non-transitory computer readable medium to perform steps in a location identity update unit, and said location identity update unit is configured to: after receiving said location identity, notify said location identity to a communicating peer end of the UE and/or an identity location register for storing said mapping relationship.

18. The system of claim 15, wherein, said first data channel management unit is configured to: send said downlink data channel address to said second data channel management unit, comprising: said first data channel management unit sending the source P-GW a request for modifying bearers for the UE, the source P-GW sending said second data channel management unit a request for pushing context information for the UE, and both requests carrying said downlink data channel address;

said second data channel management unit is configured to: send said uplink data channel address to said first data channel management unit, comprising: said second data channel management unit returning a response for pushing context information for the UE to the source P-GW, the source P-GW returning a response for modifying bearers for the UE to said first data channel management unit, and both responses carrying said uplink data channel address, wherein the identity management unit is configured to: after said second data channel management unit receives said request for pushing context information for the UE, assign the location identity to the UE;

the identity management unit is configured to: send said location identity to the source P-GW, comprising:

after said second data channel management unit receives said request for pushing context information for the UE, the identity management unit carrying said location identity in said response for pushing context information returned to the source P-GW, wherein the source P-GW comprises hardware configured to execute instructions stored in a non-transitory computer readable medium to perform steps in a data packet processing unit, wherein, said data packet processing unit is configured to: after sending the target P-GW said request for pushing the context information for the UE, if receiving uplink or downlink data packets of the UE, perform a buffering operation, and after receiving said location identity, send the uplink or downlink data packets of the UE to the target P-GW according to said location identity.

19. The system of claim 15, wherein, the location identity containing the routing information of the UE is used to locate a location identity of the target P-GW.

* * * * *